US012649824B2

(12) United States Patent
Yagyu et al.

(10) Patent No.: US 12,649,824 B2
(45) Date of Patent: Jun. 9, 2026

(54) FLUORINE-CONTAINING ETHER COMPOUND, LUBRICANT FOR MAGNETIC RECORDING MEDIUM, AND MAGNETIC RECORDING MEDIUM

(71) Applicant: Resonac Corporation, Tokyo (JP)

(72) Inventors: Daisuke Yagyu, Tokyo (JP); Tsuyoshi Kato, Tokyo (JP); Yutaka Tanji, Tokyo (JP); Ayano Asano, Tokyo (JP); Naoya Fukumoto, Tokyo (JP); Kohei Ochiai, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/687,623

(22) PCT Filed: Aug. 31, 2022

(86) PCT No.: PCT/JP2022/032769
§ 371 (c)(1),
(2) Date: Feb. 28, 2024

(87) PCT Pub. No.: WO2023/033044
PCT Pub. Date: Mar. 9, 2023

(65) Prior Publication Data

US 2025/0011538 A1 Jan. 9, 2025

(30) Foreign Application Priority Data

Sep. 2, 2021 (JP) ................................ 2021-143420

(51) Int. Cl.
*H01F 10/18* (2006.01)
*C08G 65/00* (2006.01)
*C10M 107/38* (2006.01)

(52) U.S. Cl.
CPC .......... *C08G 65/007* (2013.01); *H01F 10/18* (2013.01)

(58) Field of Classification Search
CPC ........... C08G 65/3312; C08G 65/3317; C08G 65/3318; C08G 65/33396; C10M 107/38;
(Continued)

(56) References Cited

U.S. PATENT DOCUMENTS 11,879,109 B2 * 1/2024 Asano .................. G11B 5/7257
2013/0209837 A1 * 8/2013 Sagata .................... C07C 43/23
428/833
2017/0260472 A1 * 9/2017 Sagata ................. C10M 107/38

FOREIGN PATENT DOCUMENTS

JP 5465454 B2 4/2014
JP 5909837 B2 4/2016
(Continued)

*Primary Examiner* — Holly Rickman
*Assistant Examiner* — Linda N Chau
(74) *Attorney, Agent, or Firm* — Sughrue Mion, PLLC

(57) ABSTRACT

A fluorine-containing ether compound represented by the following formula: $R^1$-[B]-[A]-O—$CH_2$—$R^2$—$CH_2$—O-[C]-[D]-$R^3$ ($R^1$ is an organic group having 7 to 18 carbon atoms, including a group in which a carbonyl carbon atom or nitrogen atom in an amide bond and an aromatic hydrocarbon are directly bonded; $R^2$ is a perfluoropolyether chain; $R^3$ is Formula (2); $X^1$ is a hydrogen atom or an organic group having 7 to 18 carbon atoms, including a group in which a carbonyl carbon atom or nitrogen atom in an amide bond and an aromatic hydrocarbon are directly bonded; [A] is Formula (3-1); [B] is Formula (3-2); [C] is Formula (4-1); [D] is Formula (4-2); and the number of hydroxyl groups in Formula (1) is 3 or more).

(2)

$$-\left[\left(CH_2\right)_a O\right]_b X^1$$

(Continued)

-continued (3-1)

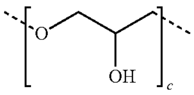

(3-2)

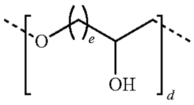

(4-1)

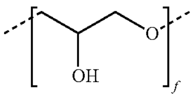

-continued (4-2)

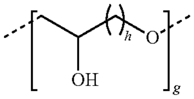

11 Claims, 1 Drawing Sheet

(58) Field of Classification Search
CPC ........ C10M 107/42; C10M 2213/0623; C10M 2217/065; C10N 2020/04; C10N 2040/18; G11B 5/7257
See application file for complete search history.

(56) References Cited

FOREIGN PATENT DOCUMENTS

| | | | |
|---|---|---|---|
| JP | 6040455 | B2 | 12/2016 |
| WO | 2017/154403 | A1 | 9/2017 |
| WO | 2018/159250 | A1 | 9/2018 |
| WO | 2019/039200 | A1 | 2/2019 |
| WO | 2019/039265 | A1 | 2/2019 |
| WO | 2019/049585 | A1 | 3/2019 |
| WO | 2019/054148 | A1 | 3/2019 |

* cited by examiner

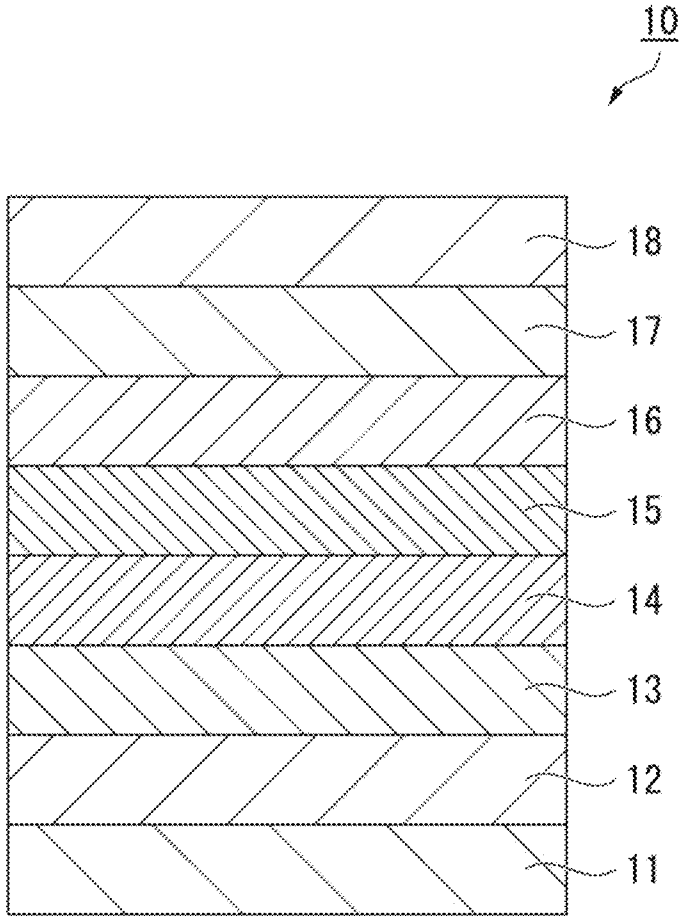
10
18
17
16
15
14
13
12
11

FLUORINE-CONTAINING ETHER COMPOUND, LUBRICANT FOR MAGNETIC RECORDING MEDIUM, AND MAGNETIC RECORDING MEDIUM

TECHNICAL FIELD

The present invention relates to a fluorine-containing ether compound, a lubricant for a magnetic recording medium, and a magnetic recording medium.

This Application is a National Stage of International Application No. PCT/JP2022/032769 filed Aug. 31, 2022, claiming priority based on Japanese Patent Application No. 2021-143420, filed Sep. 2, 2021, the content of which is incorporated herein by reference.

BACKGROUND ART

In recent years, the amount of information processing via the Internet has increased dramatically. Accordingly, the development of recording media has been focused on. In particular, magnetic recording media, which are a type of recording media, are expected to serve as a receiver for the increasing amount of data because they can store a large amount of data at low cost.

In some magnetic recording media, a magnetic layer (magnetic recording layer) is formed on a substrate, and a protective layer made of carbon or the like is formed on the magnetic layer. The protective layer protects information recorded in the magnetic layer and enhances the slidability of a magnetic head. However, sufficient durability of the magnetic recording medium cannot be obtained by simply providing the protective layer on the magnetic layer. Therefore, generally, a lubricant is applied to the surface of the protective layer to form a lubricating layer.

The lubricating layer arranged on the outermost surface of the magnetic recording medium is required to have various characteristics such as chemical substance resistance (preventing contamination with siloxane or the like), wear resistance, corrosion resistance, floating stability of the magnetic head, heat resistance/decomposition resistance, and long-term stability of the film thickness.

As a lubricant for a magnetic recording medium (hereinafter abbreviated as a "lubricant" in some cases) used in the lubricating layer, a fluorine-containing ether compound having a perfluoropolyether (hereinafter abbreviated as "PFPE" in some cases) chain has been proposed (for example, refer to Patent Documents 1 to 5).

Patent Document 1 and Patent Document 2 disclose a fluorine-containing ether compound which can form a lubricating layer having excellent chemical substance resistance and wear resistance even if the thickness is thin. Patent Document 1 discloses a fluorine-containing ether compound in which an aryl group and a hydroxyl group are arranged at one end of a PEPE chain and two or three hydroxyl groups are arranged at the other end. Patent Document 2 discloses a fluorine-containing ether compound in which a chain organic group having an amide bond is arranged at one end or both ends of a PFPE chain.

Patent Document 3 discloses a lubricant which contains a fluoropolyether compound and has a reduced film thickness per molecule while maintaining excellent decomposition resistance. Patent Document 3 discloses a fluoropolyether compound in which a phenyl group substituted with an alkoxy group, an amino group, or an amide group is arranged at one end of a PEPE chain and a specific end group containing a hydroxyl group is arranged at the other end.

Patent Document 4 discloses a magnetic disk having a lubricating layer provided therein and having excellent load/unload (LUL) durability and alumina resistance (minimization of decomposition of a lubricant due to alumina). Patent Document 4 discloses, as a compound contained in the lubricating layer, a compound which has a PFPE main chain and has an aromatic group and a hydroxyl group at the end of the molecule, where the aromatic group and the hydroxyl group are each bonded to a different carbon atom.

Patent Document 5 discloses a lubricant which contains a fluoropolyether compound, does not undergo thermal decomposition even under high heat, is not transferred (pickup) to a magnetic head, and has high heat resistance. Patent Document 5 discloses a fluoropolyether compound in which a specific linking group containing one hydroxyl group, and a phenyl group substituted with an alkoxy group, an amino group, or an amide group are arranged at both ends of a PFPE chain.

CITATION LIST

Patent Documents

[Patent Document 1]
PCT International Publication No. WO 2017/154403
[Patent Document 2]
PCT International Publication No. WO 2019/039265
[Patent Document 3]
Japanese Patent No. 5909837
[Patent Document 4]
Japanese Patent No. 5465454
[Patent Document 5]
Japanese Patent No. 6040455

SUMMARY OF INVENTION

Technical Problem

The development of magnetic recording media suitable for high recording densities has progressed in order to increase the capacity of magnetic recording and reproducing devices. In recent years, in order to improve the recording density of magnetic recording media, reduction in the magnetic spacing (the distance (floating height) between the magnetic head and the magnetic layer of the magnetic recording medium) and increase in the rotational speed of the magnetic recording medium have been required.

However, when the floating height of the magnetic head is lowered, a pickup phenomenon in which a lubricant adheres to a magnetic head as foreign matter (smear) is more likely to occur. When pickup occurs, there is a risk of floating of the magnetic head becoming unstable and the magnetic head coming into contact with the surface of the magnetic recording medium.

In addition, when the rotational speed of the magnetic recording medium increases, spin-off occurs, and the film thickness of the lubricating layer tends to decrease. Spin-off is a phenomenon in which a lubricant scatters and evaporates due to a centrifugal force and/or heat generated according to rotation of the magnetic recording medium. When the film thickness of the lubricating layer is reduced due to spin-off, characteristics required for the lubricating layer such as chemical substance resistance, wear resistance, corrosion resistance, and floating stability of the magnetic head cannot be maintained.

In addition, in order to improve the floating stability of the magnetic head, in addition to minimizing the occurrence of pickup and spin-off, it is important that the adhesion of the lubricating layer to the protective layer be favorable, and the smoothness of the lubricating layer arranged on the outermost surface of the magnetic recording medium be favorable.

The present invention has been made in view of the above circumstances, and an object of the present invention is to provide a fluorine-containing ether compound which can form a lubricating layer in which pickup and spin-off are less likely to occur and which has favorable smoothness and adhesion with respect to a protective layer, and which can be suitably used as a material for a lubricant for a magnetic recording medium.

In addition, an object of the present invention is to provide a lubricant for a magnetic recording medium which contains the fluorine-containing ether compound of the present invention and can form a lubricating layer in which pickup and spin-off are less likely to occur and which has favorable smoothness and adhesion with respect to a protective layer.

In addition, an object of the present invention is to provide a magnetic recording medium having a lubricating layer containing the fluorine-containing ether compound of the present invention and having excellent floating stability of a magnetic head.

Solution to Problem

In order to achieve the above objects, the inventors conducted extensive studies.

As a result, they found that a specific fluorine-containing ether compound having an end group including a group in which a carbonyl carbon atom or nitrogen atom in an amide bond and an aromatic hydrocarbon are directly bonded at one or both ends of a perfluoropolyether chain and having three or more hydroxyl groups is preferable. Therefore, they confirmed that, when a lubricant for a magnetic recording medium containing such a fluorine-containing ether compound is used, it is possible to form a lubricating layer in which pickup and spin-off are less likely to occur and which has favorable smoothness and adhesion with respect to a protective layer, and completed the present invention.

The present invention includes the following aspects,

A first aspect of the present invention provides the following fluorine-containing ether compound.

[1] A fluorine-containing ether compound represented by the following Formula (1):

$$R^1\text{-[B][A]-O—}CH_2\text{—}R^2\text{—}CH_2\text{—O-[C][D]-}R^3 \quad (1)$$

(in Formula (1), $R^1$ is an organic group having 7 to 18 carbon atoms, including a group in which a carbonyl carbon atom or nitrogen atom in an amide bond and an aromatic hydrocarbon are directly bonded; $R^2$ is a perfluoropolyether chain; $R^3$ is represented by the following Formula (2); in Formula (2), a represents an integer of 2 to 6, and b represents 0 or 1; $X^1$ is a hydrogen atom or an organic group having 7 to 18 carbon atoms, including a group in which a carbonyl carbon atom or nitrogen atom in an amide bond and an aromatic hydrocarbon are directly bonded; in Formula (1), [A] is represented by the following Formula (3-1); in Formula (3-1), c is an integer of 0 to 3; in Formula (1), [B] is represented by the following Formula (3-2); in Formula (3-2), d is an integer of 0 to 3, and e is an integer of 2 to 5, provided that a sum of c in Formula (3-1) and d in Formula (3-2) is 1 to 3; in Formula (1), [A] and [B] may be interchanged; in Formula (1), [C] is represented by the following Formula (4-1); in Formula (4-1), f is an integer of 0 to 3; in Formula (1), [D] is represented by the following Formula (4-2); in Formula (4-2), g is an integer of 0 to 3, and h is an integer of 2 to 5, provided that a sum of f in Formula (4-1) and g in Formula (4-2) is 1 to 3; in Formula (1), [C] and [D] may be interchanged; when [C] is directly bonded to $R^3$, $R^3$ does not become a hydrogen atom; and the number of hydroxyl groups in Formula (1) is 3 or more, and the numbers of hydroxyl groups in $R^1$ and $R^3$ are each 0 or 1).

(2)

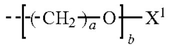

(3-1)

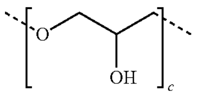

(3-2)

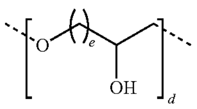

(4-1)

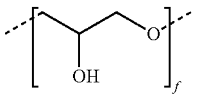

(4-2)

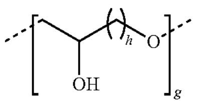

The fluorine-containing ether compound according to the first aspect of the present invention preferably has characteristics described in the following [2] to [8]. It is also preferable to arbitrarily combine two or more characteristics described in the following [2] to [8].

[2] The fluorine-containing ether compound according to [1], wherein $R^1$ in Formula (1) has any of structures represented by the following Formulae (5-1) to (5-5):

(5-1)

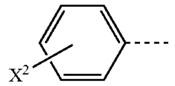

(5-2)

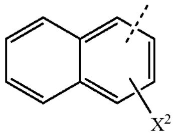

(5-3)

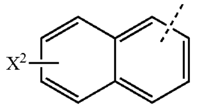

(5-4)

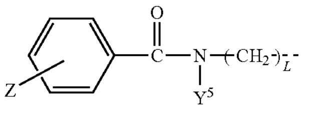

-continued (5-5)

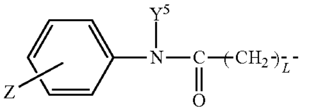

(in Formulae (5-1) to (5-3), $X^2$ is one, two or s represented by Formula (6-1) or (6-2)

(in Formulae (5-4) (5-5), $Y^5$ is a hydrogen atom or an alkyl group having 1 to 6 carbon atoms; L represents an integer of 1 to 6; and Z is an one, or two or more selected from among hydrogen atom, an alkyl group having 1 to 6 carbon atoms, an alkoxy group having 1 to 6 carbon atoms, and a group represented by Formula (6-1) or (6-2))

(6-1)

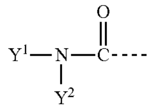

(6-2)

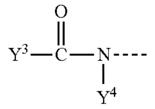

(in Formula (6:1), $Y^1$ and $Y^2$ are each independently a hydrogen atom, an alkyl group having 1 to 7 carbon atoms, or a cyclic structure in which $Y^1$ and $Y^2$ are bonded to each other; and a total number of carbon atoms contained in Formula (6-1) is 1 to 8) (in Formula (6-2). $Y^3$ is an alkyl group having 1 to 7 carbon atoms, and $Y^4$ is a hydrogen atom or an alkyl group having 1 to 6 carbon atoms; $Y^3$ and $Y^4$ may be bonded to each other to form a cyclic structure; and a total number of carbon atoms contained in Formula (6-2) is 2 to 8).

[3] The fluorine-containing ether compound according to [1] or [2].

wherein $R^1$-[B]-[A]-and-[C]-[D]-$R^3$ in Formula (1) are the same.

[4] The fluorine-containing ether compound according to [1] or [2], wherein $X^1$ in Formula (2) is a hydrogen atom.

[5] The fluorine-containing ether compound according to [1] or [2], wherein-[C]-[D]-$R^3$ in Formula (1) is any of the following Formulae (7-1) to (7-3):

(7-1)

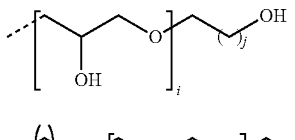

(7-2)

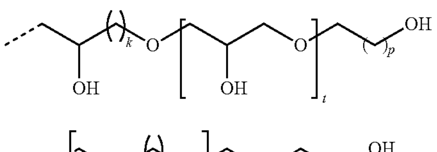

(7-3)

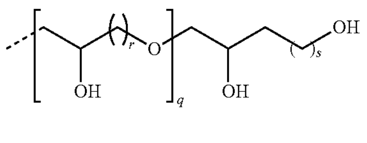

(in Formula (7-1), i represents 1 or 2, and j represents an integer of 1 to 5)

(in Formula (7-2), k represents an integer of 2 to 5, t represents 0 or 1, and p represents an integer of 1 to 5)

(in Formula (7-3), q represents 0 or 1, r represents an integer of 1 to 5, and s represents an integer of 1 to 4).

[6] The fluorine-containing ether compound according to any one of [1] to [5].

wherein $R^2$ in Formula (1) is represented by the following Formula (8-1):

$$—(CF_2)_{w1}—O—(CF_2O)_{w2}—(CF_2CF_2O)_{w3}—(CF_2CF_2CF_2O)_{w4}—(CF_2CF_2CF_2CF_2O)_{w5}—(CF_2)_{w6}— \quad (8\text{-}1)$$

(in Formula (8-1), w2, w3, w4, and w5 indicate an average degree of polymerization, and each independently represent 0 to 30, provided that w2, w3, w4, and w5 are not all 0 at the same time; w1 and w6 are an average value indicating the number of $CF_2$'s, and each independently represent 1 to 3; and an arrangement order of repeating units in Formula (8-1) is not particularly limited).

[7] The fluorine-containing ether compound according to any one of [1] to [6], wherein $R^2$ in Formula (1) is any of the following Formulae (8-2) to (8-5):

$$—CF_2O—(CF_2CF_2)_u—(CF_2O)_v—CF_2— \quad (8\text{-}2)$$

(in Formula (8-2), u and v indicate an average degree of polymerization, and each represent 0 to 30, provided that a or v is 0.1 or more)

$$—(CF_2)_{w7}—O—(CF_2CF_2CF_2O)_{w8}—(CF_2CF_2O)_{w9}(CF_2)_{w10}— \quad (8\text{-}3)$$

(in Formula (8-3), w8 and w9 indicate an average degree of polymerization, and each independently represent 0.1 to 30; and w7 and w10 are an average value indicating the number of $CF_2$'s, and each independently represent 1 to 2)

$$—CF_2CF_2O—(CF_2CF_2CF_2O)_x—CF_2CF_2— \quad (8\text{-}4)$$

(in Formula (8-4), x indicates an average degree of polymerization, and represents 0.1 to 30)

$$—CF_2CF_2CF_2O—(CF_2CF_2CF_2CF_2O)_y—CF_2CF_2CF_2— \quad (8\text{-}5)$$

(in Formula (8-5), y indicates an average degree of polymerization, and represents 0.1 to 30).

[8] The fluorine-containing ether compound according to any one of [1] to [7], wherein a number-average molecular weight thereof is in a range of 500 to 10,000.

A second aspect of the present invention provides the following lubricant for a magnetic recording medium.

[9] A lubricant for a magnetic recording medium including the fluorine-containing ether compound according to any one of [1] to [8].

A third aspect of the present invention provides the following magnetic recording medium.

[10] A magnetic recording medium in which at least a magnetic layer, a protective layer, and a lubricating layer are sequentially provided on a substrate.

wherein the lubricating layer contains the fluorine-containing ether compound according to any one of [1] to [8].

The magnetic recording medium according to the third aspect of the present invention preferably has characteristics described in the following [11].

[11] The magnetic recording medium according to [10], wherein the lubricating layer has an average film thickness of 0.5 mm to 2.0 mm.

Advantageous Effects of Invention

The fluorine-containing ether compound of the present invention is a compound represented by Formula (1), and is suitable as a material for the lubricant for a magnetic recording medium.

The lubricant for a magnetic recording medium of the present invention contains the fluorine-containing ether compound of the present invention. Therefore, it is possible to form a lubricating layer in which pickup and spin-off are less likely to occur and which has favorable smoothness and adhesion with respect to the protective layer.

Since the magnetic recording medium of the present invention has a lubricating layer in which pickup and spin-off are less likely to occur and which has favorable smoothness and adhesion with respect to the protective layer, the floating stability of the magnetic head is excellent. Therefore, the magnetic recording medium of the present invention can reduce the magnetic spacing and increase the rotational speed, and can contribute to improving the recording density.

BRIEF DESCRIPTION OF DRAWINGS

The FIGURE is a schematic cross-sectional view showing one preferable embodiment of a magnetic recording medium of the present invention.

DESCRIPTION OF EMBODIMENTS

In order to achieve the above objects, the inventors have focused on the relationship between the molecular structure of a fluorine-containing ether compound contained in a lubricating layer and a protective layer, and conducted extensive studies as follows.

In the past, in order to obtain a lubricating layer having favorable adhesion to the protective layer, a fluorine-containing ether compound having a hydroxyl group in the molecule has been used as a lubricant. However, even with a fluorine-containing ether compound having a plurality of hydroxyl groups in the molecule, a lubricating layer formed using a conventional lubricant may not have sufficient adhesion to the protective layer.

When the adhesion between the lubricating layer and the protective layer is insufficient, the lubricating layer becomes bulky, and it is difficult to obtain a lubricating layer having a uniform film thickness and favorable smoothness. This is presumed to be because the fluorine-containing ether compound contained in the lubricating layer locally aggregates, a part of the fluorine-containing ether compound molecule rises from the surface of the protective layer, and unevenness is formed on the surface of the lubricating layer. In addition, local aggregation of fluorine-containing ether compounds and rising of fluorine-containing ether compound molecule from the surface of the protective layer cause pickup and spin-off.

In addition, the inventors conducted extensive studies, and as a result, found that, when a fluorine-containing ether compound contained in a lubricating layer contains hydroxyl groups that are not involved in adsorption with the protective layer, sufficient adhesion between the lubricating layer and the protective layer is not obtained, the unevenness of the surface of the lubricating layer becomes larger, and pickup and spin-off are likely to occur.

For example, in the fluorine-containing ether compound having a vicinal diol structure (—CH(OH)—CH(OH)—) in which carbon atoms to which hydroxyl groups are bonded are bonded to each other, two adjacent hydroxyl groups of the vicinal diol Structure cannot be adsorbed to the protective layer at the same time due to steric factors. Furthermore, when one hydroxyl group among the two hydroxyl groups is adsorbed to the protective layer, the other hydroxyl group cannot be involved in adsorption with the protective layer, and rises from the surface of the protective layer. As a result, the lubricating layer containing the fluorine-containing ether compound having a vicinal diol structure tends to have insufficient adhesion to the protective layer, and pickup and spin-off are likely to occur. Therefore, among hydroxyl groups contained in the fluorine-containing ether compound, hydroxyl groups that have risen from the surface of the protective layer tend to attract contamination of the lubricating layer. Accordingly, the lubricating layer containing the fluorine-containing ether compound having a vicinal diol structure is not preferable in consideration of the floating stability of the magnetic head and chemical substance resistance.

Therefore, the inventors conducted extensive studies regarding the molecular structure of a fluorine-containing ether compound used as a material for a lubricating layer in order to improve the adhesion of the lubricating layer to the protective layer. As a result, they found that a fluorine-containing ether compound in which a specific linking group having a secondary hydroxyl group is arranged at both ends of a PFPE chain via a methylene group (—$CH_2$—), and an organic group including a group in which a carbonyl carbon atom or nitrogen atom in an amide bond and an aromatic hydrocarbon are directly bonded is arranged at at least one end is preferable, and completed the present invention.

Hereinafter, examples of the fluorine-containing ether compound, the lubricant for a magnetic recording medium, and the magnetic recording medium of the present invention will be described in detail. Here, the present invention is not limited to only the following embodiments. In the present invention, numbers, amounts, ratios, materials, configurations, and the like can be added, omitted, substituted, and changed without departing from the gist and scope of the present invention.

[Fluorine-Containing Ether Compound]

A fluorine-containing ether compound of the present embodiment is represented by the following Formula (1):

$$R^1\text{-[B][A]-O—}CH_2\text{—}R^2\text{—}CH_2\text{—O-[C][D]-}R^2 \quad (1)$$

(in Formula (1), $R^1$ is an organic group having 7 to 18 carbon atoms, including a group in which a carbonyl carbon atom or nitrogen atom in an amide bond and an aromatic hydrocarbon are directly bonded; $R^2$ is a perfluoropolyether chain; $R^3$ is represented by the following Formula (2); in Formula (2), a represents an integer of 2 to 6, and b represents 0 or 1; $X^1$ is a hydrogen atom or an organic group having 7 to 18 carbon atoms, including a group in which a carbonyl carbon atom or nitrogen atom in an amide bond and an aromatic hydrocarbon are directly bonded; in Formula (1), [A] is represented by the following Formula (3-1); in Formula (3-1), c is an integer of 0 to 3; in Formula (1), [B] is represented by the following Formula (3-2); in Formula (3-2), d is an integer of 0 to 3, and e is an integer of 2 to 5, provided that a sum of c in Formula (3-1) and d in Formula (3-2) is 1 to 3; in Formula (1),

[A] and [B] may be interchanged; in Formula (1), [C] is represented by the following Formula (4-1); in Formula (4-1), f is an integer of 0 to 3, in Formula (1), [D] is represented by the following Formula (4-2); in Formula (4-2), g is an integer of 0 to 3, and h is an integer of 2 to 5, provided that a sum of f in Formula (4-1) and g in Formula (4-2) is 1 to 3; in Formula (1), [C] and [D] may be interchanged; when [C] is directly bonded to $R^3$. $R^3$ does not become a hydrogen atom; and the number of hydroxyl groups in Formula (1) is 3 or more, and the numbers of hydroxyl groups in $R^1$ and $R^3$ are each 0 or 1).

(2)

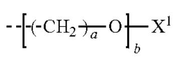

(3-1)

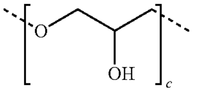

(3-2)

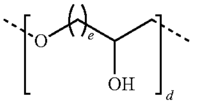

(4-1)

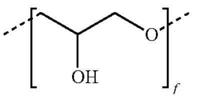

(4-2)

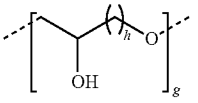

(PEPE Chain Represented by $R^2$)

In the fluorine-containing ether compound represented by Formula (1) of the present embodiment, $R^2$ is a perfluoropolyether (PFPE) chain. When the lubricant containing the fluorine-containing ether compound is applied onto a protective layer and a lubricating layer is formed, the PFPE chain covers the surface of the protective layer, imparts lubricity to the lubricating layer, and reduces a frictional force between the magnetic head and the protective layer. The PFPE chain represented by $R^2$ is not particularly limited, and can be appropriately selected depending on performance required for the lubricant and the like.

Examples of PFPE chains represented by $R^2$ include those composed of perfluoromethylene oxide polymers, perfluoroethylene oxide polymers, perfluoro-n-propylene oxide polymers, perfluoroisopropylene oxide polymers, perfluoro-n-butylene oxide polymers, and copolymers thereof.

$R^2$ in Formula (1) is preferably, for example, a structure represented by the following Formula (8-1), which is derived from a perfluoroalkylene oxide polymer or copolymer.

$$—(CF_2)_{w1}—O)CF_2O)_{w2}—(CF_2CF_2O)_{w3}—(CF_2CF_2CF_2O)_{w4}—(CF_2CF_2CF_2CF_2O)_{w5}—(CF_2)_{w6}— \quad (8\text{-}1)$$

(in Formula (8-1), w2, w3, w4, and w5 indicate an average degree of polymerization, and each independently represent 0 to 30, provided that w2, w3, w4, and w5 are not all 0 at the same time; w1 and w6 are an average value indicating the number of $CF_2$'s, and each independently represent 1 to 3; and an arrangement order of repeating units in Formula (8-1) is not particularly limited).

In Formula (8-1), w2, w3, w4, and w5 indicate an average degree of polymerization, and each independently represent 0 to 30, and are preferably 0 to 20, and more preferably 0 to 15. For example, w2, w3, w4, and w5 may each independently be 1 to 28, 2 to 25, 3 to 17, or 5 to 10.

In Formula (8-1), w1 and w6 are an average value indicating the number of $CF_2$'s, and each independently represent 1 to 3. w1 and w6 are determined according to the structure of repeating units arranged at the end of the chain structure in the PEPE chain represented by Formula (8-1). ($CF_2O$), ($CF_2CF_2O$), ($CF_2CF_2CF_2O$), and ($CF_2CF_2CF_2CF_2O$) in Formula (8-1) are repeating units. The arrangement order of repeating units in Formula (8-1) is not particularly limited. In addition, the number of types of repeating units in Formula (8-1) is not particularly limited.

Specifically, $R^2$ in Formula (1) is preferably any of the following Formulae (8-2) to (8-5).

$$—CF_2O—(CF_2CF_2)_u—(CF_2O)_v—CF_2— \quad (8\text{-}2)$$

(in Formula (8-2), u and v indicate an average degree of polymerization, and each represent 0 to 30, provided that u or v is 0.1 or more)

$$—(CF_2)_{w7}—O—(CF_2CF_2CF_2O)_{w8}—(CF_2CF_2O)_{w9}(CF_2)_{w10}— \quad (8\text{-}3)$$

(in Formula (8-3), w8 and w9 indicate an average degree of polymerization, and each independently represent 0.1 to 30; and w7 and w10 are an average value indicating the number of $CF_2$'s, and each independently represent 1 to 2)

$$—CF_2CF_2O—(CF_2CF_2CF_2O))_x—CF_2CF_2— \quad (8\text{-}4)$$

(in Formula (8-4), x indicates an average degree of polymerization, and represents 0.1 to 30)

$$—CF_2CF_2CF_2O—(CF_2CF_2CF_2O)_y—CF_2CF_2CF_2— \quad (8\text{-}5)$$

(in Formula (8-5), y indicates an average degree of polymerization, and represents 0.1 to 30)

In Formula (8-2), the arrangement order of the repeating units ($CF_2CF_2O$) and ($CF_2O$) is not particularly limited. In Formula (8-2), the number u of ($CF_2CF_2O$)'s and the number v of ($CF_2O$)'s may be the same as or different from each other. The PFPE chain represented by Formula (8-2) may be a polymer of ($CF_2CF_2O$) or a polymer of ($CF_2O$)). In addition, the PFPE chain represented by Formula (8-2) may include any of a random copolymer, a block copolymer, and an alternating copolymer composed of ($CF_2CF_2O$) and ($CF_2O$).

In Formula (8-2), u indicating an average degree of polymerization is 0 to 30, preferably 1 to 20, and more preferably 2 to 15. In Formula (8-2), v indicating an average degree of polymerization is 0 to 30, preferably 0 to 20, and more preferably 0 to 15, v may be 1 to 10 or 2 to 5. In Formula (8-2), when v is 0, u is preferably 1 to 20. When u and v indicating an average degree of polymerization are within the above range, this is preferable because a fluorine-containing ether compound that easily wets and spreads on the protective layer and from which a lubricating layer having a uniform film thickness can be easily formed, is obtained.

In Formula (8-3), the arrangement order of the repeating units ($CF_2CF_2CF_2O$) and ($CF_2CF_2O$) is not particularly limited. In Formula (8-3), the number w8 of ($CF_2CF_2CF_2O$)'s and the number w9 of ($CF_2CF_2O$)'s, which indicate an average degree of polymerization, may be the same as or different from each other. The PFPE chain represented by Formula (8-3) may include any of a random copolymer, a block copolymer, and an alternating copolymer composed of $(CF_2CF_2CF_2O))$ and $(CF_2CF_2O)$.

In Formula (8-3), w8 and w9 indicating an average degree of polymerization are each independently 0.1 to 30, preferably 0.1 to 20, and more preferably 1 to 15. When w8 and w9 indicating an average degree of polymerization are within the above range, this is preferable because a fluorine-containing ether compound that easily wets and spreads on the protective layer and from which a lubricating layer having a uniform film thickness can be easily formed, is obtained. w7 and w10 in Formula (8-3) are an average value indicating the number of $CF_2$'s, and each independently represent 1 to 2. w7 and w10 are determined according to the structure of repeating units arranged at the end of the chain structure in the PFPE chain represented by Formula (8-3).

In Formula (8-4), x indicating an average degree of polymerization represents 0.1 to 30. When x is 0.1 to 30, the number-average molecular weight of the fluorine-containing ether compound of the present embodiment tends to fall within a preferable range. x is preferably 1 to 20 and more preferably 2 to 15.

In Formula (8-5), y indicating an average degree of polymerization represents 0.1 to 30. When y is 0.1 to 30, the number-average molecular weight of the fluorine-containing ether compound of the present embodiment tends to fall within a preferable range. y is preferably 1 to 20 and more preferably 2 to 15.

When $R^2$ in Formula (1) is any of Formulae (8-2) to (8-5), a fluorine-containing ether compound which can form a lubricating layer having favorable lubricity is obtained. In addition, when $R^2$ in Formula (1) is any of Formulae (8-2) to (8-5), the ratio of the number of oxygen atoms (the number of ether bonds (—O—)) to the number of carbon atoms in the PFPE chain and the arrangement of oxygen atoms in the PFPE chain are appropriate. Therefore, the fluorine-containing ether compound having an appropriate hardness is obtained. Therefore, the fluorine-containing ether compound applied onto the protective layer is less likely to aggregate on the protective layer, and a thinner lubricating layer can be formed at a sufficient coating rate. In addition, when R in Formula (1) is any of Formulae (8-2) to (8-5), this is preferable because the fluorine-containing ether compound is easily synthesized. Particularly, when $R^2$ is Formula (8-2) or Formula (8-4), this is more preferable because a raw material is readily available.

(Linking Group Represented by -[B]-[A]-)

In the fluorine-containing ether compound represented by Formula (1) of the present embodiment, -[B]-[A]- is a divalent linking group. In Formula (1), [A] and [B] may be interchanged. [A] is represented by Formula (3-1), and [B] is represented by Formula (3-2), c in Formula (3-1) and d in Formula (3-2) are an integer of 0 to 3.

In consideration of availability of raw materials and ease of synthesis, the linking group represented by -[B]-[A]- is preferably a combination in which e in Formula (3-1) is 1 and d in Formula (3-2) is 0 or a combination in which e is 0 and d is 1.

In addition, in consideration of adhesion with the protective layer, the linking group represented by -[B]-[A]- is preferably a combination in which e is 2 and d is 0 or a combination in which e is 1 and d is 1. When c is 2 and d is 0, in the fluorine-containing ether compound, the direction in which two hydroxyl groups in Formula (3-1) are arranged is sterically the same direction with respect to the extending direction of the PEPE chain, and the two hydroxyl groups in Formula (3-1) tend to be easily adsorbed to the protective layer. In addition, when c and d are 1 and the bonding order of [A] and [B] is -[A]-[B]- from the side of RE, the distance between hydroxyl groups included in the linking group represented by -[A]-[B]- becomes longer. Therefore, it is possible to reduce the occurrence of intramolecular hydrogen bond of the fluorine-containing ether compound represented by Formula (1) and to increase the adhesion to the protective layer.

e in Formula (3-2) is an integer of 2 to 5. Since e is 2 or more, when the bonding order of [A] and [B] is -[A]-[B]- from the side of $R^1$, it is possible to reduce the degree of intramolecular hydrogen bond between the hydroxyl groups contained in [B], and the hydroxyl group contained in [B] and the hydroxyl group contained in [A] adjacent to [B]. Since e is 5 or less, it is possible to minimize an increase in the surface free energy of the entire molecule due to a decrease in the proportion of fluorine atoms in the fluorine-containing ether compound molecule. Generally, the fluorine-containing ether compound having a large surface free energy of the entire molecule tends to attract contamination of the lubricating layer containing this compound. Therefore, in consideration of chemical substance resistance of the lubricating layer, it is preferable that the fluorine-containing ether compound have a low surface free energy of the entire molecule. When d is an integer of 1 to 3, e is preferably an integer of 2 to 4 and most preferably 2.

In the linking group represented by -[B]-[A]-, a sum of c in Formula (3-1) and d in Formula (3-2) is 1 to 3. Since the sum of c and d is 1 or more, a lubricating layer having excellent adhesion to the protective layer can be formed due to the adsorption force of the hydroxyl group of the linking group represented by -[B]-[A]- with respect to the protective layer. Since the sum of c and d is 3 or less, a sufficient proportion of fluorine atoms in the fluorine-containing ether compound molecule can be secured. The sum of c and d is preferably 1 or 2, and is appropriately determined depending on the number of hydroxyl groups contained in -[C]-[D]-$R^3$.

(End Group Represented by $R^1$)

In Formula (1), the number of hydroxyl groups contained in the end group represented by $R^1$ is 0 or 1. $R^1$ is an organic group having 7 to 18 carbon atoms, including a group in which a carbonyl carbon atom or nitrogen atom in an amide bond and an aromatic hydrocarbon are directly bonded. In $R^1$, either a carbonyl carbon atom or nitrogen atom constituting an amide bond may be directly bonded to the aromatic hydrocarbon group.

Generally, it is known that an amide bond directly bonded to an aromatic hydrocarbon group forms the same plane as the aromatic hydrocarbon group and stabilizes it. Therefore, $R^1$ in Formula (1) has a rigid structure in which the amide bond and the aromatic hydrocarbon group form the same plane, and thus, free rotation of the bond is inhibited. Therefore, it is presumed that $R^1$ in Formula (1) is easily adsorbed to the protective layer. Accordingly, in the lubricating layer containing the fluorine-containing ether compound of the present embodiment, a part of the fluorine-containing ether compound molecule is less likely to rise from the surface of the protective layer, and the adhesion to the protective layer becomes favorable.

On the other hand, instead of $R^1$ in Formula (1), when an organic group in which a carbonyl carbon atom or nitrogen atom in an amide bond is not directly bonded to the aromatic hydrocarbon group, and a methylene group ($—CH_2—$) as a linking group is interposed between the carbonyl carbon atom or nitrogen atom in the amide bond and the aromatic hydrocarbon group is provided as an end group, the lubricating layer containing the fluorine-containing ether compound is less likely to be adsorbed to the protective layer. This is presumed to be because the end group is bent at the bonding site composed of the methylene group, and the amide bond and the aromatic hydrocarbon group are not on the same plane.

In addition, when a chain organic group having an amide bond is provided as an end group instead of $R^1$ in Formula (1), the lubricating layer containing the fluorine-containing ether compound is unlikely to be adsorbed to the protective layer. This is presumed to be because a planar structure like $R^1$ in Formula (1) cannot be formed because the bond in the chain organic group of the end group has a high degree of freedom.

The number of amide bonds contained in $R^1$ in Formula (1) is not particularly limited, and may be 1 or may be 2 or more. The number of amide bonds contained in $R^1$ is preferably 1 in consideration of case of synthesis of the fluorine-containing ether compound. When carbonyl carbon atoms or nitrogen atoms of a plurality of amide bonds are directly bonded to the aromatic hydrocarbon group of $R^1$, the number of amide bonds contained in $R^1$ is preferably 2.

In consideration of the solubility of the fluorine-containing ether compound in a solvent, the aromatic hydrocarbon group contained in $R^1$ in Formula (1) is preferably a benzene ring or a naphthalene ring, and more preferably a benzene ring. When the aromatic hydrocarbon group is a benzene ring or a naphthalene ring, the solubility in a solvent is better compared to a fluorine-containing ether compound having a polycyclic aromatic hydrocarbon group in which three or more rings are condensed, and it becomes easy to apply a lubricant containing this compound.

The sum of carbon atoms contained in $R^1$ in Formula (1) is 7 to 18, and is preferably 7 to 15 and more preferably 7 to 13 because that makes it possible to minimize a decrease in the proportion of fluorine atoms in the fluorine-containing ether compound molecule.

In Formula (D), $R^1$ preferably has a any of structures represented by the following Formulae (5-1) to (5-5) in consideration e adhesion of the fluorine containing ether compound to the protective layer, and more preferably has any of structures represented by Formula (5-1), Formula (5-4), and Formula (5-5) in consideration of the solubility of the fluorine-containing ether compound in a solvent, and particularly preferably has a structure represented by Formula (5-1) because the amide bond and the aromatic hydrocarbon group tend to form the same plane.

(5-1)

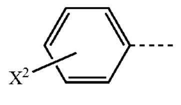

(5-2)

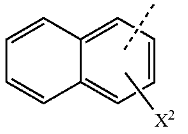

(5-3)

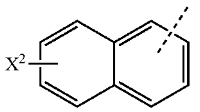

-continued (5-4)

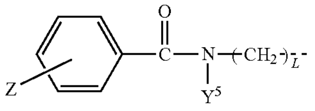

(5-5)

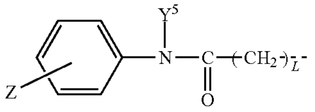

(in Formulae (5-1) to (5-3), $X^2$ is on two or more groups represented by Formula (6-1) or (6-2))

(in Formulae (5-4) and (5-5), $Y^5$ is a hydrogen atom or an alkyl group having 1 to 6 carbon atoms; L represents an integer of 1 to 6; and Z is any one, or two or more selected from among a hydrogen atom, an alkyl group having 1 to 6 carbon atoms, an alkoxy group having 1 to 6 carbon atoms, and a group represented by Formula (6-1) or (6-2))

(6-1)

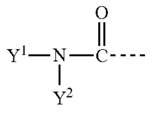

(6-2)

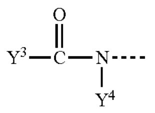

(in Formula (6-1). $Y^1$ and $Y^2$ are each independently a hydrogen atom, an alkyl group having 1 to 7 carbon atoms, or a cyclic structure in which $Y^1$ and $Y^2$ are bonded to each other; and a total number of carbon atoms contained in Formula (6-1) is 1 to 8) (in Formula (6-2), $Y^3$ is an alkyl group having 1 to 7 carbon atoms, and $Y^4$ is a hydrogen atom or an alkyl group having 1 to 6 carbon atoms; $Y^3$ and $Y^4$ may be bonded to each other to form a cyclic structure; and a total number of carbon atoms contained in Formula (6-2) is 2 to 8).

In Formulae (5-1), (5-4), and (5-5), the position of the substituent bonded to the benzene ring is not particularly limited. For example, when the number of $X^2$ in Formula (5-1) is 1, the positional relationship may be any of ortho, meta, and para. In addition, when the number of Z in Formulae (5-4) and (5-5) is 1, the positional relationship may be any of ortho, meta, and para.

In Formulae (5-2) and (5-3), the position of the substituent bonded to the naphthalene ring is not particularly limited, and all combinations can be selected.

In Formula (6-1), $Y^1$ and $Y^2$ are each independently a hydrogen atom, an alkyl group having 1 to 7 carbon atoms, or a cyclic structure in which $Y^1$ and $Y^2$ are bonded to each other.

The alkyl group having 1 to 7 carbon atoms may be linear or branched. Specifically, as an alkyl group having 1 to 7 carbon atoms, a methyl group, ethyl group, n-propyl group, isopropyl group, n-butyl group, sec-butyl group, isobutyl group, tert-butyl group, n-pentyl group and its structural isomers, n-hexyl group and its structural isomers, and n-heptyl group and its structural isomers may be exemplified.

In consideration of steric hindrance when adsorbed to the protective layer, $Y^1$ and/or $Y^2$ is preferably any one selected from among a hydrogen atom, a methyl group, an ethyl group, and an n-propyl group, at least one of $Y^1$ and $Y^2$ is more preferably a hydrogen atom, and both $Y^1$ and $Y^2$ are most preferably a hydrogen atom. When one of $Y^1$ and $Y^2$ is a hydrogen atom, the —NH— group contained in $R^1$ is adsorbed to the protective layer, and thus, the fluorine-containing ether compound which can form a lubricating layer having even better adhesion to the protective layer is obtained. In addition, when both $Y^1$ and $Y^2$ are a hydrogen atom, the steric hindrance caused by $Y^1$ and $Y^2$ when adsorbed to the protective layer is the smallest, and the —$NH_2$ group contained in $R^1$ is adsorbed to the protective layer. Accordingly, the fluorine-containing ether compound which can form a lubricating layer having even better adhesion to the protective layer is obtained.

When $Y^1$ and $Y^2$ in Formula (6-1) are bonded to form a cyclic structure, a cyclic structure composed of only the nitrogen atom constituting an amide bond and methylene groups (—$CH_2$—), or a combination of the nitrogen atom constituting an amide bond, methylene groups (—$CH_2$—), and an ether bond (—O—) is preferable. In consideration of chemical stability of the amide bond (—C(=O)—N—) contained in Formula (6-1), the cyclic structure formed by bonding $Y^1$ and $Y^2$ to each other is preferably a five-membered ring or a six-membered ring.

The total number of carbon atoms contained in Formula (6-1) is 1 to 8, and in consideration of steric hindrance when adsorbed to the protective layer, it is preferably 1 to 5 and more preferably 1 to 3, In Formula (6-2), $Y^3$ is an alkyl group having 1 to 7 carbon atoms. The alkyl group having 1 to 7 carbon atoms may be linear or branched. In consideration of steric hindrance when adsorbed to the protective layer, $Y^3$ is preferably one selected from among a methyl group, an ethyl group, an n-propyl group, and an isopropyl group, and more preferably a methyl group.

In Formula (6-2), $Y^4$ is a hydrogen atom or an alkyl group having 1 to 6 carbon atoms. The alkyl group having 1 to 6 carbon atoms may be linear or branched. In consideration of steric hindrance when adsorbed to the protective layer, $Y^4$ is preferably any one selected from among a hydrogen atom, a methyl group, and an ethyl group, more preferably a hydrogen atom or a methyl group, and most preferably a hydrogen atom. When $Y^4$ is a hydrogen atom, the —NH— group contained in $R^1$ is adsorbed to the protective layer, and thus, the fluorine-containing ether compound which can form a lubricating layer having even better adhesion to the protective layer is obtained.

$Y^3$ and $Y^4$ in Formula (6-2) may be bonded to each other to form a cyclic structure. The cyclic structure formed by bonding $Y^3$ and $Y^4$ to each other is preferably a cyclic structure composed of only the amide bond (—C(=O)—N—) and methylene groups (—$CH_2$—). In consideration of chemical stability of the amide bond contained in Formula (6-2), the cyclic structure formed by bonding $Y^3$ and $Y^4$ to each other is preferably a five-membered ring or a six-membered ring.

In consideration of steric hindrance when adsorbed to the protective layer, the total number of carbon atoms contained in Formula (6-2) is 2 to 8, preferably 2 to 5, and more preferably 2 to 3.

In Formulae (5-4) and (5-5), $Y^5$ is a hydrogen atom or an alkyl group having 1 to 6 carbon atoms. The alkyl group having 1 to 6 carbon atoms may be linear or branched. In consideration of steric hindrance when adsorbed to the protective layer, $Y^5$ is preferably any one selected from among a hydrogen atom, a methyl group, and an ethyl group, more preferably a hydrogen atom or a methyl group, and most preferably a hydrogen atom. When $Y^5$ is a hydrogen atom, the —NH— group contained in $R^1$ is adsorbed to the protective layer, and thus, the fluorine-containing ether compound which can form a lubricating layer having even better adhesion to the protective layer is obtained.

In Formulae (5-4) and (5-5), L represents an integer of 1 to 6. When L is an integer of 6 or less, it is possible to minimize an increase in the surface free energy of the entire molecule due to a decrease in the proportion of fluorine atoms in the fluorine-containing ether compound molecule. Lis more preferably an integer of 3 or less because that makes it possible to effectively minimize an increase in the surface free energy of the entire molecule. In addition, in consideration of stability of the fluorine-containing ether compound, L is preferably an integer of 2 or more. L is most preferably 2 or 3 because that makes it possible to minimize an increase in the surface free energy of the entire molecule, and the fluorine-containing ether compound with favorable stability is obtained.

In Formulae (5-4) and (5-5), Z is any one, or two or more selected from among a hydrogen atom, an alkyl group having 1 to 6 carbon atoms, an alkoxy group having 1 to 6 carbon atoms, and a group represented by Formula (6-1) or (6.2), and is preferably any one selected from among the above examples. An alkyl group having 1 to 6 carbon atoms and an alkoxy group having 1 to 6 carbon atoms may be linear or branched.

Z is preferably any one selected from among a hydrogen atom, an alkyl group having 1 to 3 carbon atoms, and an alkoxy group having 1 to 3 carbon atoms, and more preferably any one selected from among a hydrogen atom, a methyl group, and a methoxy group. When Z is any one selected from among a hydrogen atom, a methyl group, and a methoxy group, it is possible to minimize an increase in the surface free energy of the entire molecule due to a decrease in the proportion of fluorine atoms in the fluorine-containing ether compound molecule.

The total number of carbon atoms contained in Formula (5-4) or (5-5) is 8 to 18, and is preferably 8 to 15 and more preferably 8 to 13 because that makes it possible to minimize a decrease in the proportion of fluorine atoms in the fluorine-containing ether compound molecule.

Specifically, the end group represented by $R^1$ is preferably any of the following Formulae (10-1) to (10-34), more preferably any of the following Formulae (10-1) to (10-4), (10-10) to (10-14), (10-16) to (10-19), (10-21), (10-22), (10-25) to (10-27), (10-29), and (10)-31) to (10-34) because a fluorine-containing ether compound which can form a lubricating layer having even better adhesion to the protective layer according to adsorption of the NH— group or —$NH_2$ group contained in $R^1$ to the protective layer obtained, and particularly preferably Formula (10-1) or Formula (10-12) because that makes it possible to minimize a decrease in the proportion of fluorine atoms in the fluorine-containing ether compound molecule:

(10-1)

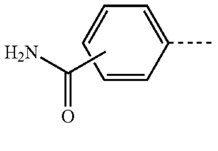

-continued
(10-2)
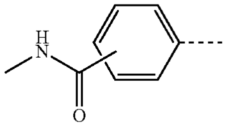
(10-3)
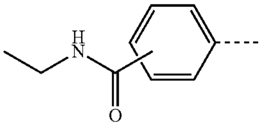
(10-4)
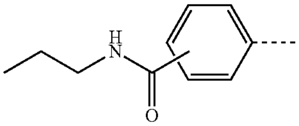
(10-5)
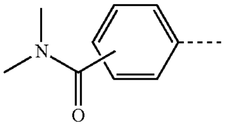
(10-6)
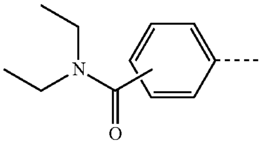
(10-7)
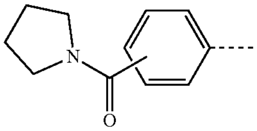
(10-8)
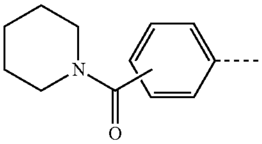
(10-9)
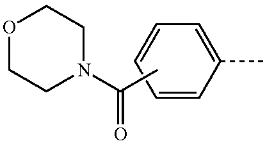
(10-10)
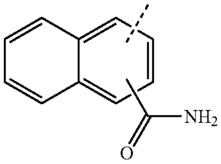
(10-11)
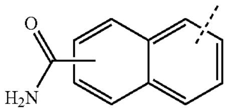
(10-12)
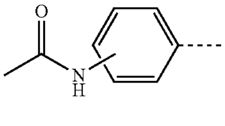
-continued
(10-13)
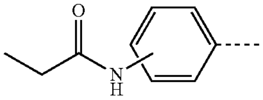
(10-14)
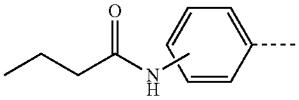
(10-15)
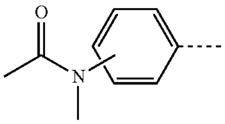
(10-16)
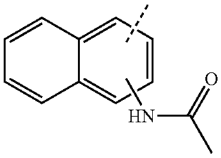
(10-17)
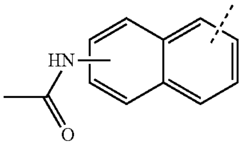
(10-18)
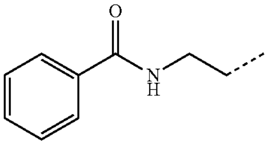
(10-19)
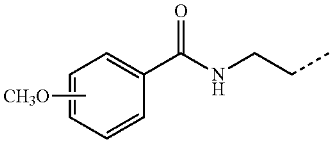
(10-20)
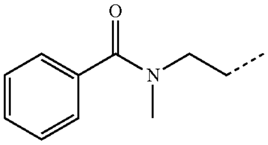
(10-21)
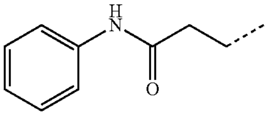
(10-22)
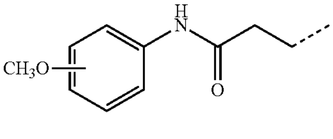
(10-23)
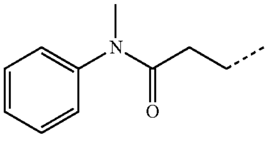

-continued (10-24)

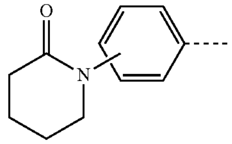

(10-25)

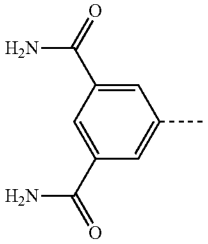

(10-26)

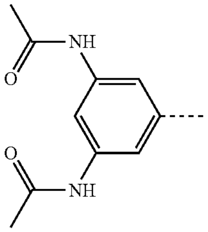

(10-27)

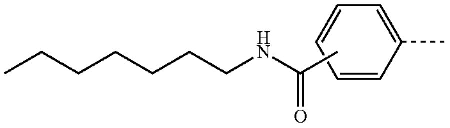

(10-28)

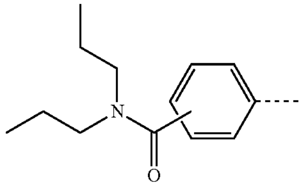

(10-29)

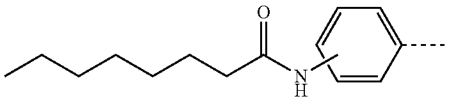

(10-30)

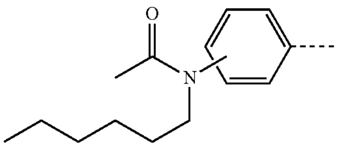

(10-31)

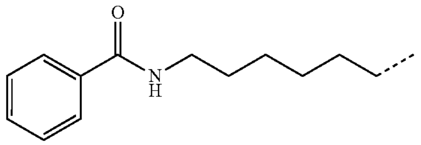

(10-32)

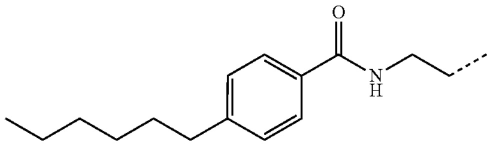

-continued (10-33)

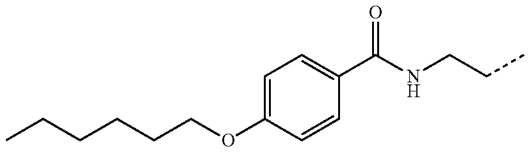

(10-34)

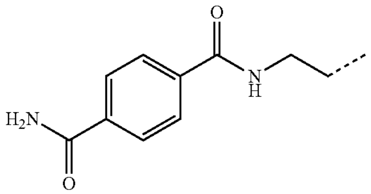

(Linking Group Represented by -[C]-[D]-)

In the fluorine-containing ether compound represented by Formula (1) of the present embodiment. [C]-[D]-, is a divalent linking group. In Formula (1), [C] and [D] may be interchanged. [C] is represented by Formula (4-1), and [D] is represented by Formula (4-2). f in Formula (4-1) and g in Formula (4-2) are an integer of 0 to 3.

In consideration of availability of raw materials and case of synthesis, the linking group represented by -[C]-[D]- is preferably a combination in which fin Formula (4-1) is 1 and g in Formula (4-2) is 0 or a combination in which f is 0 and g is 1.

In addition, in consideration of adhesion with the protective layer, the linking group represented by -[C]-[D]- is preferably a combination in which f is 2 and g is 0 or a combination in which f is 1 and g is 1. When f is 2 and g is 0, in the fluorine-containing ether compound, the direction in which two hydroxyl groups in Formula (4-1) are arranged is sterically the same direction with respect to the extending direction of the PEPE chain, and the two hydroxyl groups in Formula (4-1) tend to be easily adsorbed to the protective layer. In addition, when f and g are 1 and the bonding order of [C] and [D] is -[D]-[C]- from the side of $R^2$, the distance between hydroxyl groups included in the linking group represented by -[D]-[C]- becomes longer. Therefore, it is possible to reduce the occurrence of intramolecular hydrogen bond of the fluorine-containing ether compound represented by Formula (1) and to increase the adhesion to the protective layer.

h in Formula (4-2) is an integer of 2 to 5. Since his 2 or more, when the bonding order of [C] and [D] is -[D]-[C]- from the side of $R^2$, it is possible to reduce the occurrence of intramolecular hydrogen bond between the hydroxyl groups contained in [D], and between the hydroxyl group contained in [D] and the hydroxyl group contained in [C] adjacent to [D], Since h is 5 or less, it is possible to minimize an increase in the surface free energy of the entire molecule due to a decrease in the proportion of fluorine atoms in the fluorine-containing ether compound molecule. When g is an integer of 1 to 3, h is preferably an integer of 2 to 4 and most preferably 2.

In the linking group represented by -[C]-[D]-, a sum of fin Formula (4-1) and g in Formula (4-2) is 1 to 3. When the sum of f and g is 1 or more, a lubricating layer having excellent adhesion to the protective layer can be formed due to the adsorption force of the hydroxyl group of the linking group represented by -[C]-[D]- with respect to the protective layer. Since the sum of f and g is 3 or less, a sufficient proportion of fluorine atoms in the fluorine-containing ether compound molecule can be secured. The sum of f and g is preferably 1 or 2, and is appropriately determined depending on the number of hydroxyl groups contained in $R^1$-[B]-[A]-.

(End Group Represented by $R^1$)

In Formula (1), the number of hydroxyl groups contained in the end group represented by $R^3$ is 0 or 1. $R^3$ is represented by Formula (2). In Formula (2), a represents an integer of 2 to 6, and b represents 0 or 1.

When b in Formula (2) is 0, it is possible to effectively minimize an increase in the surface free energy of the entire molecule due to a decrease in the proportion of fluorine atoms in the fluorine-containing ether compound molecule.

When b in Formula (2) is 1 and $X^1$ is an organic group having 7 to 18 carbon atoms, including a group in which a carbonyl carbon atom or nitrogen atom in an amide bond and an aromatic hydrocarbon are directly bonded, since the ether bond contained in Formula (2) imparts flexibility to the fluorine-containing ether compound represented by Formula (1), it is more easily adsorbed to the protective layer.

When b in Formula (2) is 1 and $X^1$ is a hydrogen atom, a primary hydroxyl group is arranged at the terminal end ($-CH_2OH$) of the end group represented by $R^3$. The primary hydroxyl group has a stronger adsorption force with respect to the protective layer than the secondary hydroxyl group. Therefore, in the lubricating layer containing the fluorine-containing ether compound in which a primary hydroxyl group is arranged at the terminal end ($-CH_2OH$) of the end group represented by $R^3$, a part of the fluorine-containing ether compound molecule does not rise from the surface of the protective layer, and adhesion to the protective layer is further improved.

In addition, when b in Formula (2) is 1, since a is an integer of 2 to 6, the end group represented by $R^1$ is chemically stable and is less likely to be decomposed. a is preferably an integer of 2 to 4 and more preferably 2 or 3. When a is 2 or 3, it is possible to minimize an increase in the surface free energy of the entire molecule due to a decrease in the proportion of fluorine atoms in the fluorine-containing ether compound molecule.

$X^1$ in Formula (2) is a hydrogen atom or an organic group having 7 to 18 carbon atoms, including a group in which a carbonyl carbon atom or nitrogen atom in an amide bond and an aromatic hydrocarbon are directly bonded. When $X^1$ is an organic group having 7 to 18 carbon atoms, including a group in which a carbonyl carbon atom or nitrogen atom in an amide bond is directly bonded to an aromatic hydrocarbon, as $X^1$, those exemplified as the end group represented by $R^1$ can be used. $X^1$ may be the same as or different from $R^1$.

When $X^1$ in Formula (2) is an organic group having 7 to 18 carbon atoms, including a group in which a carbonyl carbon atom or nitrogen atom in an amide bond is directly bonded to an aromatic hydrocarbon, the fluorine-containing ether compound represented by Formula (1) has an organic group including a group in which a carbonyl carbon atom or nitrogen atom in an amide bond and an aromatic hydrocarbon are directly bonded at both ends of the molecule. Accordingly, the fluorine-containing ether compound represented by Formula (1) can form a lubricating layer having even better adhesion to the protective layer.

In addition, when $X^1$ in Formula (2) is an organic group having 7 to 18 carbon atoms, including a group in which a carbonyl carbon atom or nitrogen atom in an amide bond is directly bonded to an aromatic hydrocarbon, it is preferable that $R^1$-[B]-[A]- and -[C]-[D]-$R^3$ in Formula (1) have the same structure. In other words, in the fluorine-containing ether compound represented by Formula (1), it is preferable that both sides of the PFPE chain represented by $R^2$ have a symmetrical structure. This is because such a fluorine-containing ether compound can be easily produced and the production cost is low. In this case, b in Formula (2) is 0, and $X^1$ is the same as $R^1$.

$X^1$ in Formula (2) is preferably a hydrogen atom. A fluorine-containing ether compound in which $X^1$ is a hydrogen atom has favorable solubility in a solvent. Therefore, a lubricant containing this compound is preferable because it can be easily applied to a magnetic recording medium. In addition, when $X^1$ is a hydrogen atom, whether b is 0 or 1, a primary hydroxyl group is arranged at the terminal end ($-CH_2OH$) of the end group represented by $R^3$. Therefore, a part of the fluorine-containing ether compound molecule does not rise from the surface of the protective layer, and the adhesion of the lubricating layer to the protective layer is further improved.

However, in the fluorine-containing ether compound represented by Formula (1) of the present embodiment, when [C] is directly bonded to $R^3$, $R^3$ does not become a hydrogen atom (in other words, a case in which b in Formula (2) is 0 and $X^1$ is a hydrogen atom). When [C] is directly bonded to $R^3$, b in Formula (2) is 0 and $X^1$ is an organic group having 7 to 18 carbon atoms, including a group in which a carbonyl carbon atom or nitrogen atom in an amide bond and an aromatic hydrocarbon are directly bonded, or b in Formula (2) is 1. This is because, if $R^3$ is a hydrogen atom when [C] is directly bonded to $R^2$, a fluorine-containing other compound having a vicinal diol structure ($-CH(OH)-CH(OH)-$) is obtained. As described above, two adjacent hydroxyl groups of the vicinal diol structure cannot be adsorbed to the protective layer at the same time due to steric factors. Therefore, the lubricating layer containing the fluorine-containing ether compound having a vicinal diol structure is not preferable in consideration of the floating stability of the magnetic head and chemical substance resistance.

-[C]-[D]-$R^3$ in Formula (1) is preferably any of the following Formulae (7-1) to (7-3), and more preferably Formula (7-1) because a fluorine-containing ether compound which can form a lubricating layer having even better adhesion to the protective layer is obtained.

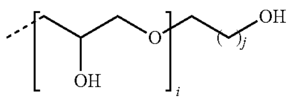

(7-1)

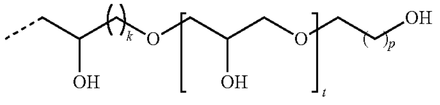

(7-2)

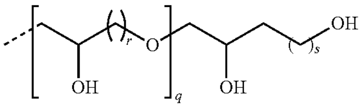

(7-3)

(in Formula (7-1), i represents 1 or 2, and j represents an integer of 1 to 5)

(in Formula (7-2), k represents an integer of 2 to 5, l represents 0 or 1, and p represents an integer of 1 to 5)

(in Formula (7-3), q represents 0 or 1, r represents an integer of 1 to 5, and s represents an integer of 1 to 4), In Formulae (7-1) to (7-3), since i in Formula (7-1) is 1 or 2, t in Formula (7-2) is 0 or 1, and q in Formula (7-3) is 0 or 1, a total number of hydroxyl groups included in -[C]-[D]- is 1 or 2, and the number of hydroxyl groups included in -[C]-[D]-$R^3$ is 2 or 3. Therefore, the fluorine-containing ether compound in which -[C]-[D]-$R^3$ is any of Formulae (7-1) to (7-3) can form a lubricating layer having favorable adhesion to the protective layer due to the adsorption force of the hydroxyl group of the fluorine-containing ether compound with respect to the protective layer.

j in Formula (7-1) is an integer of 1 to 5, and is preferably an integer of 1 to 3 and more preferably 1 or 2 so that it is easy to secure the proportion of fluorine atoms in the fluorine-containing ether compound molecule.

k in Formula (7-2) is an integer of 2 to 5, and is preferably 2 or 3 and more preferably 2 so that it is easy to secure the proportion of fluorine atoms in the fluorine-containing ether compound molecule. In addition, p in Formula (7-2) is an integer of 1 to 5, and is preferably an integer of 1 to 3 and more preferably 1 or 2 so that it is easy to secure the proportion of fluorine atoms in the fluorine-containing ether compound molecule.

r in Formula (7-3) is an integer of 1 to 5, and is preferably an integer of 1 to 3 and more preferably 1 or 2 so that it is easy to secure the proportion of fluorine atoms in the fluorine-containing ether compound molecule. s in Formula (7-3) is an integer of 1 to 4, and is preferably an integer of 1 to 3 and more preferably 1 or 2 so that it is easy to secure the proportion of fluorine atoms in the fluorine-containing ether compound molecule.

In the fluorine-containing ether compound represented by Formula (1) of the present embodiment, the number of hydroxyl groups contained in the molecule is 3 or more. Therefore, the lubricating layer containing the fluorine-containing ether compound can obtain sufficient adhesion to the protective layer due to an adsorption force of the hydroxyl group in the fluorine-containing ether compound with respect to the protective layer. In addition, since the lubricating layer has favorable adhesion to the protective layer, the unevenness of the surface is small and pickup and spin-off are less likely to occur. The number of hydroxyl groups contained in the fluorine-containing ether compound molecule is preferably 3 to 5 and more preferably 3 to 4 in order to minimize the surface free energy of the entire molecule.

Specifically, the fluorine-containing ether compound represented by Formula (1) is preferably a compound represented by the following Formulae (AA) to (BB). Here, the repeating numbers in Formulae (AA) to (BB) are values indicating an average degree of polymerization, and thus are not necessarily integers.

When the compound represented by Formula (1) is any of compounds represented by the following Formulae (AA) to (BB), raw materials are easily available, and moreover, a fluorine-containing ether compound which can form a lubricating layer in which pickup and spin-off are less likely to occur and which has favorable smoothness and adhesion with respect to the protective layer is obtained.

In all compounds represented by the following Formulae (AA) to (AD), $R^1$ is represented by Formula (10-1), which has a structure represented by Formula (5-1), and the positional relationship of the substituent bonded to the benzene ring is an ortho position. In all compounds represented by the following Formulae (AA) to (AD), -[B]-[A]- is represented by Formula (3-1), c is 1, -[C]-[D]- is represented by Formula (4-1), and f is 1. $R^3$ is represented by Formula (2), a is 2, b is 1, and $X^1$ is a hydrogen atom.

In the compound represented by the following Formula (AA), $R^2$ is a PFPE chain represented by Formula (8-2), and u and y are each 1 to 30. In the compound represented by the following Formula (AB), $R^2$ is a PEPE chain represented by Formula (8-2), u is 1 to 30, and v is 0. In the compound represented by the following Formula (AC), $R^2$ is the PEPE chain represented by Formula (8-4). In the compound represented by the following Formula (AD), $R^2$ is the PEPE chain represented by Formula (8-5).

In the compounds represented by the following Formula (AE) and Formula (AF). $R^1$ is represented by Formula (10-1), which has a structure represented by Formula (5-1). In Formula (AE), the positional relationship of the substituent bonded to a benzene ring of $R^1$ is a meta position, and in Formula (AF), the positional relationship of the substituent bonded to a benzene ring of $R^1$ is a para position. In the compound represented by the following Formula (AG), $R^1$ is represented by Formula (10-11), which has a structure represented by Formula (5-3).

In compounds represented by the following Formulae (AB) to (AG), [B][A]- is is represented by Formula (3-1), e is 1, -[C]-[D]- is represented by Formula (4-1), and f is 1. $R^3$ is represented by Formula (2), a is 2, b is 1, and $X^1$ is a hydrogen atom. $R^2$ is a PFPE chain which is represented by Formula (8-2) and in which u and v are each 1 to 30.

All compounds represented by the following Formulae (AH) to (AM) have a structure in which $R^1$ is represented by Formula (5-1), and the positional relationship of the substituent bonded to a benzene ring of $R^1$ is a para position. In the compound represented by the following Formula (AH), $R^1$ is represented by Formula (10-27), in the compound represented by the following Formula (AI), $R^1$ is represented by Formula (10-28), in the compound represented by the following Formula (AJ), $R^1$ is represented by Formula (10-8), in the compound represented by the following Formula (AK), $R^1$ is represented by Formula (10-12), in the compound represented by the following Formula (AL). $R^1$ is represented by Formula (10-29), and in the compound represented by the following Formula (AM), $R^1$ is represented by Formula (10-30).

All compounds represented by the following Formulae (AN) to (AR) have a structure in which $R^1$ is represented by Formula (5-4). In the compound represented by the following Formula (AN), $R^1$ is represented by Formula (10-18), in the compound represented by the following Formula (AO), $R^1$ is represented by Formula (10-31), in the compound represented by the following Formula (AP), $R^1$ is represented by Formula (10-32), in the compound represented by the following Formula (AQ), $R^1$ is represented by Formula (10-33), and in the compound represented by the following Formula (AR), $R^1$ is represented by Formula (10-34).

Compounds represented by the following Formula (AS) and Formula (AT) have a structure in which $R^1$ is represented by Formula (5-5). In the compound represented by the following Formula (AS), $R^1$ is represented by Formula (10-21), and in the compound represented by the following Formula (AT), $R^1$ is represented by Formula (10-23).

In all compounds represented by the following Formulae (AH) to (AT), -[B]-[A]- is represented by Formula (3-1), c is 1, -[C]-[D]- is represented by Formula (4-1), and f is 1. $R^3$ is represented by Formula (2), a is 2, b is 1, and $X^1$ is a hydrogen atom. $R^2$ is a PEPE chain which is represented by Formula (8-2) and in which u and v are each 1 to 30.

In all compounds represented by the following Formulae (AU) to (AZ), $R^1$ is represented by Formula (10-1), which has a structure represented by Formula (5-1), the positional relationship of the substituent bonded to the benzene ring is an ortho position, and $R^2$ is a PFPE chain represented by Formula (8-2), in which u and v are each 1 to 30.

In the compound represented by the following Formula (AU). [B]-[A]- is represented by Formula (3-1), c is 1, -[C]-[D]- is represented by Formula (4-1), and f is 1. $R^3$ is represented by Formula (2), a is 6, b is 1, and $X^1$ is a hydrogen atom.

In the compound represented by the following Formula (AV), -[B]-[A]- is represented by Formula (3-1), e is 1, -[C]-[D]- is represented by Formula (4-1), and f is 2. $R^3$ is represented by Formula (2), a is 2, b is 1, and $X^1$ is a hydrogen atom.

In the compound represented by the following Formula (AW), -[B]-[A]- is represented by Formula (3-1), e is 2, -[C]-[D]- is represented by Formula (4-1), and f is 1. $R^1$ is represented by Formula (2), a is 2, b is 1, and $X^1$ is a hydrogen atom, In the compound represented by the following Formula (AX), -[B]-[A]- is represented by Formula (3-1), c is 2, -[C]-[D]- is represented by Formula (4-2), g is 1, and h is 2. $R^3$ is represented by Formula (2), b is 0, and $X^1$ is a hydrogen atom.

In the compound represented by the following Formula (AY), -[B]-[A]- is represented by Formula (3-1), and c is 1, -[C]-[D]- is represented by Formula (4-1) and Formula (4-2), f is 1, g is 1, and his S. The bonding order of [C] and [D] is -[C]-[D]- from the side of $R^2$. $R^3$ is represented by Formula (2), b is 0, and $X^1$ is a hydrogen atom.

In the compound represented by the following Formula (AZ), -[B]-[A]- is represented by Formula (3-1), and c is 1. -[C]-[D]- is represented by Formula (4-1) and Formula (4-2), f is 1, g is 1, and h is 2. The bonding order of [C] and [D] is [D]-[C]- from the side of $R^2$. $R^3$ is represented by Formula (2), a is 2, b is 1, and $X^1$ is a hydrogen atom.

In all compounds represented by the following Formula (BA) and Formula (BB), $R^1$ is represented by Formula (10-12), which has a structure represented by Formula (5-1), and the positional relationship of bonded to a benzene ring is a para position. $R^2$ is the PFPE chain represented by Formula (8-4). -[C]-[D]- is represented by Formula (4-1), and f is 2. $R^3$ is represented by Formula (2), b is 0, and $X^1$ and $R^1$ are the same, In the compound represented by the following Formula (BA), -[B]-[A]- is represented by Formula (3-1), and c is 1. In the compound represented by the following Formula (BB), -[B]-[A]- is represented by Formula (3-1), and c is 2.

(AA)

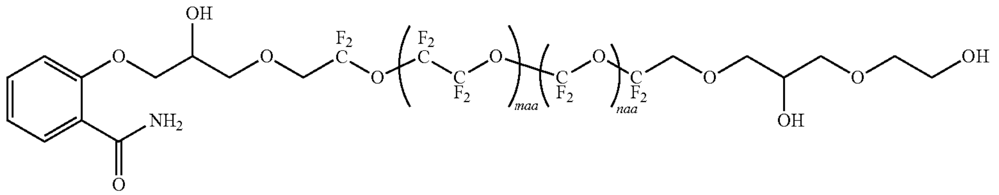

(AB)

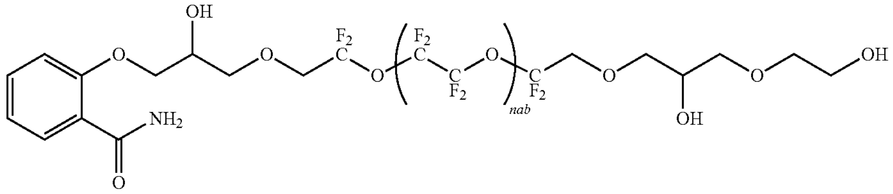

(AC)

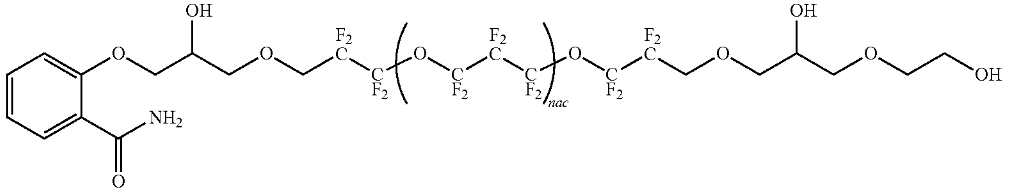

(AD)

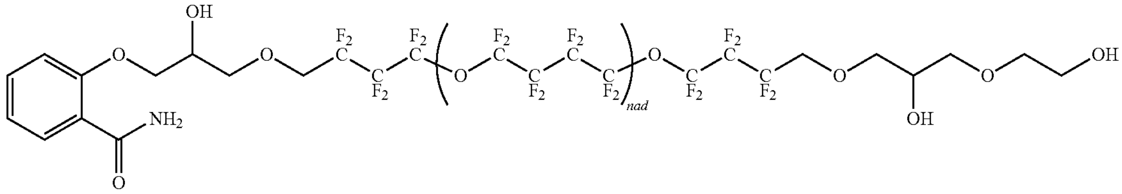

(in Formula (AA), maa and naa indicate an average degree of polymerization, and each represent 1 to 30)

(in Formula (AB), nab indicates an average degree of polymerization, and represents 1 to 30)

(in Formula (AC), nac indicates an average degree of polymerization, and represents 1 to 30)

(in Formula (AD), nad indicates an average degree of polymerization, and represents 1 to 30)

(AE)

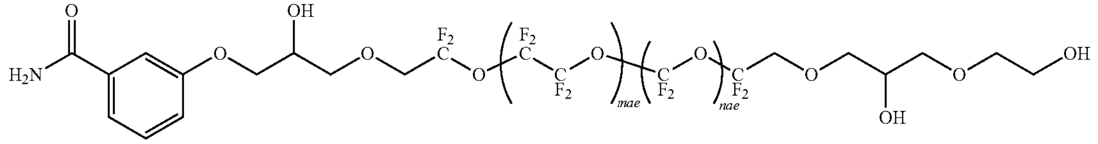

(AF)

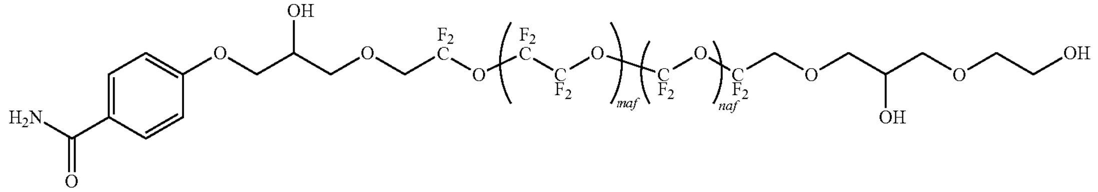

(AG)

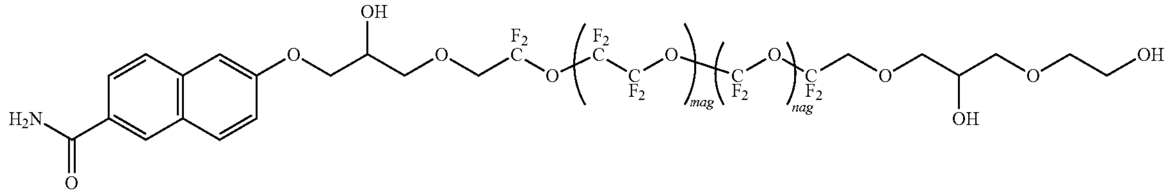

(AH)

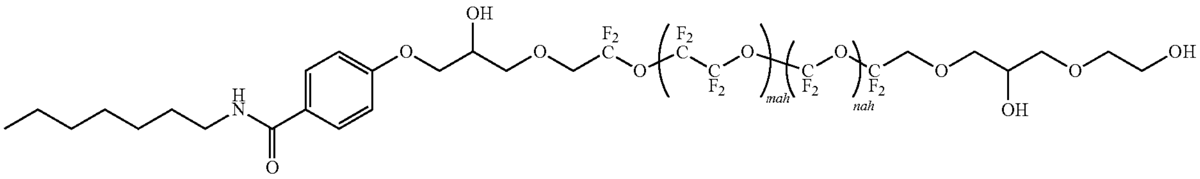

(in Formula (AE), mae and nae indicate an average degree of polymerization, and each represent 1 to 30)

(in Formula (AF), maf and naf indicate an average degree of polymerization, and each represent 1 to 30)

(in Formula (AG), mag and nag indicate an average degree of polymerization, and each represent 1 to 30)

(in Formula (AH), mah and nah indicate an average degree of polymerization, and each represent 1 to 30)

(AI)

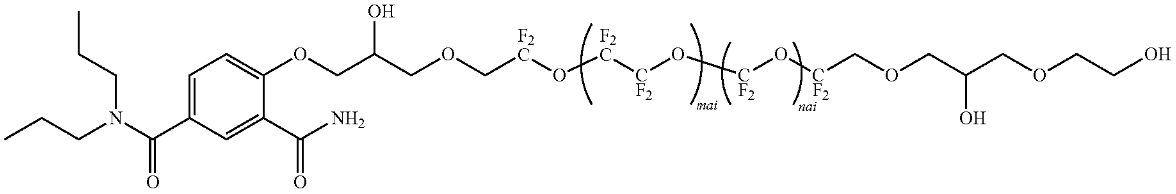

(AJ)

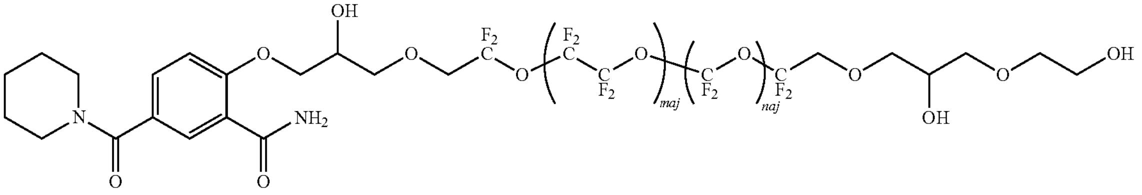

(AK)

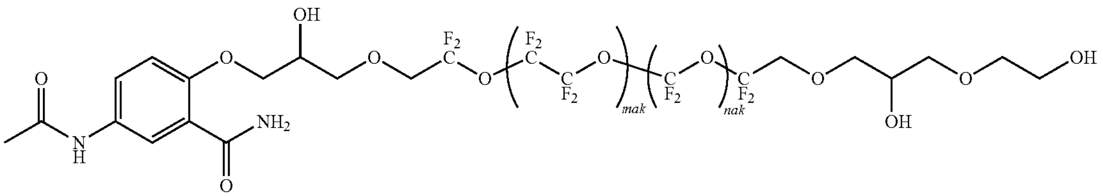

-continued (AL)

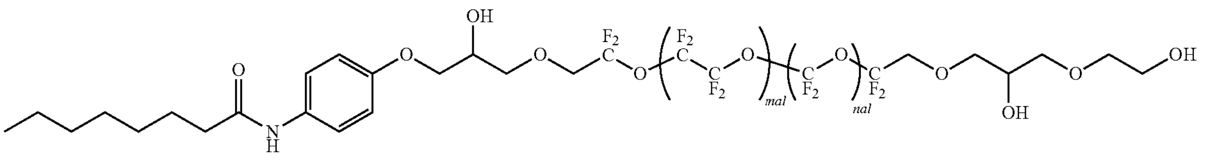

(in Formula (AI), mai and nai indicate an average degree of polymerization, and each represent 1 to 30)
(in Formula (AJ), maj and naj indicate an average degree of polymerization, and each represent 1 to 30)
(in Formula (AK), mak and nak indicate an average degree of polymerization, and each represent 1 to 30)
(in Formula (AL), mal and nal indicate an average degree of polymerization, and each represent 1 to 30)

(AM)

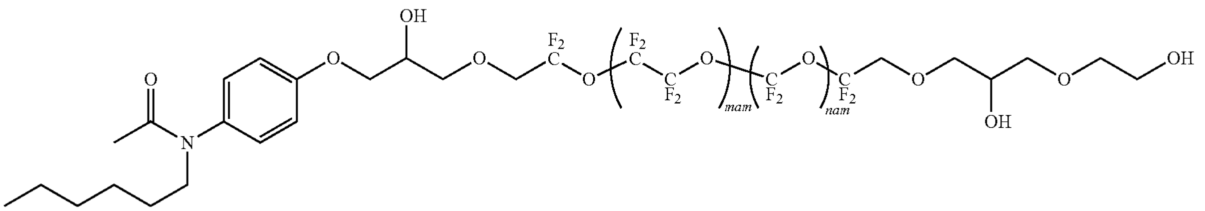

(AN)

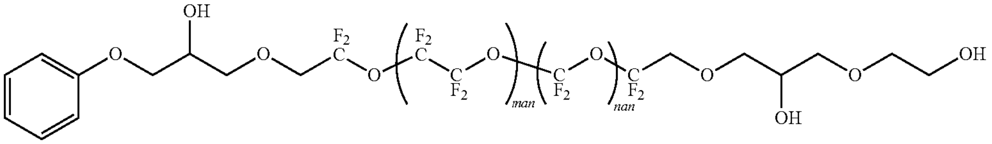

(AO)

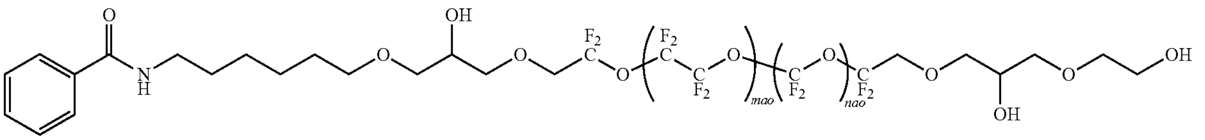

(AP)

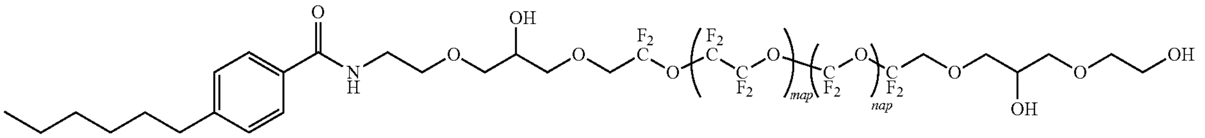

(in Formula (AM), mam and nam indicate an average degree of polymerization, and each represent 1 to 30)
(in Formula (AN), man and nan indicate an average degree of polymerization, and each represent 1 to 30)
(in Formula (AO), mao and nao indicate an average degree of polymerization, and each represent 1 to 30)
(in Formula (AP), map and nap indicate an average degree of polymerization, and each represent 1 to 30)

(AQ)

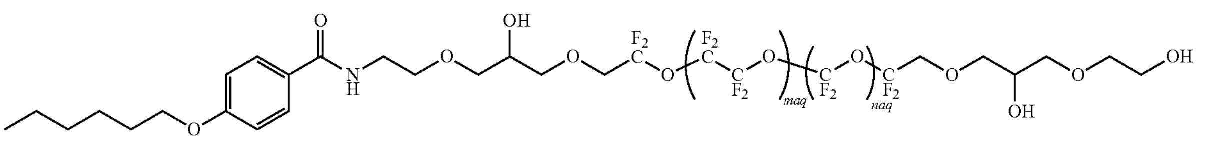

-continued (AR)

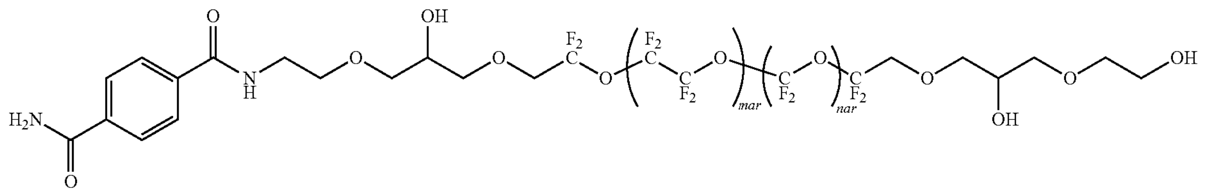

(AS)

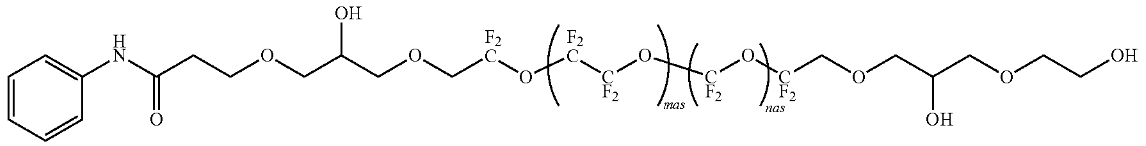

(AT)

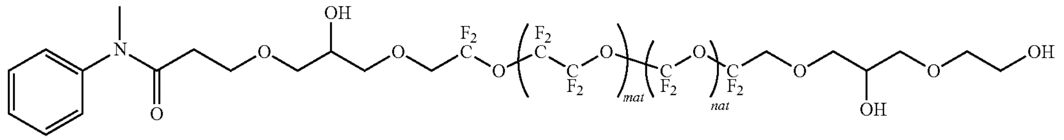

(in Formula (AQ), maq and naq indicate an average degree of polymerization, and each represent 1 to 30)

(in Formula (AT), mat and nat indicate an average degree of polymerization, and each represent 1 to 30)

(AU)

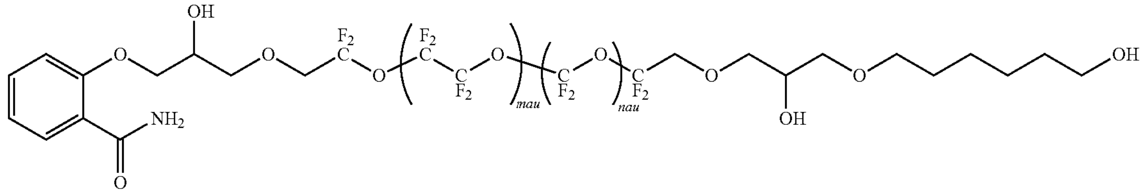

(AV)

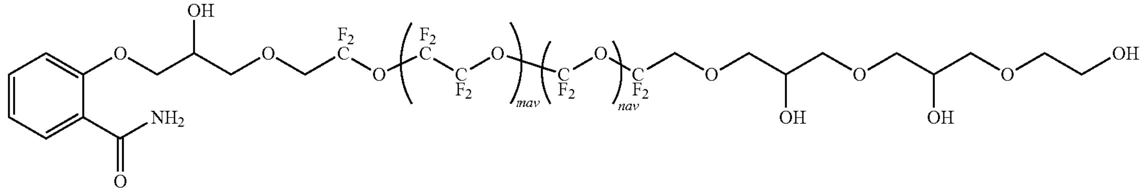

(AW)

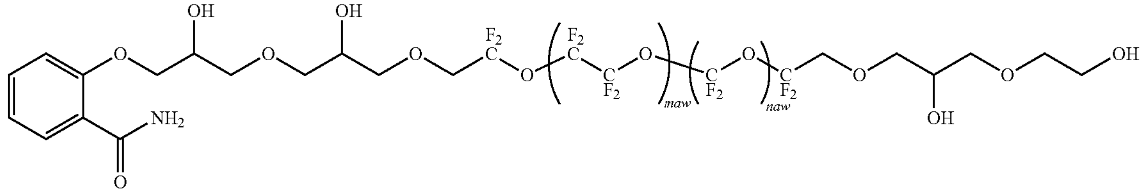

(AX)

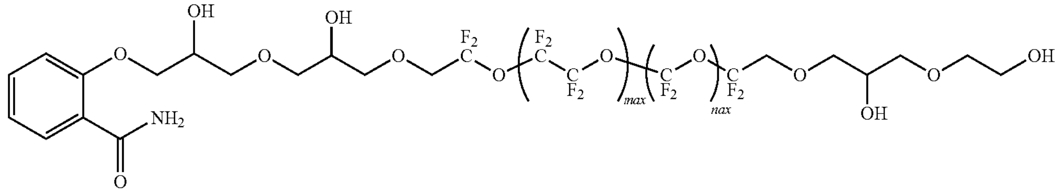

(in Formula (AR), mar and nar indicate an average degree of polymerization, and each represent 1 to 30)

(in Formula (AS), mas and nas indicate an average degree of polymerization, and each represent 1 to 30)

(in Formula (AU), mau and nau indicate an average degree of polymerization, and each represent 1 to 30)

(in Formula (AV), mav and nav indicate an average degree of polymerization, and each represent 1 to 30)

(in Formula (AW), maw and naw indicate an average degree of polymerization, and each represent 1 to 30)
(in Formula (AX), max and nax indicate an average degree of polymerization, and each represent 1 to 30)

In consideration of case of obtainability of raw materials for the PFPE chain, the number-average molecular weight of the fluorine-containing ether compound of the present embodiment is more preferably in a range of 1,000 to 3,000.

(AY)

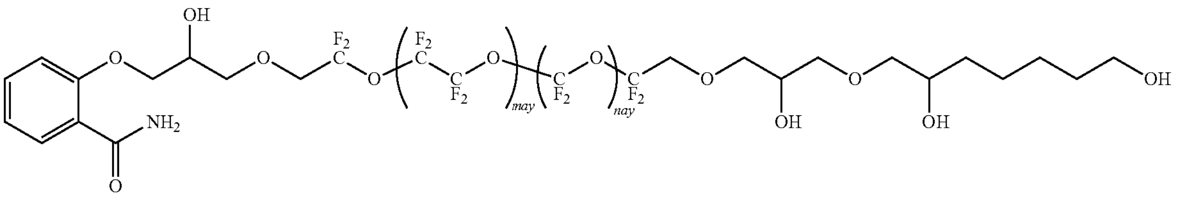

(AZ)

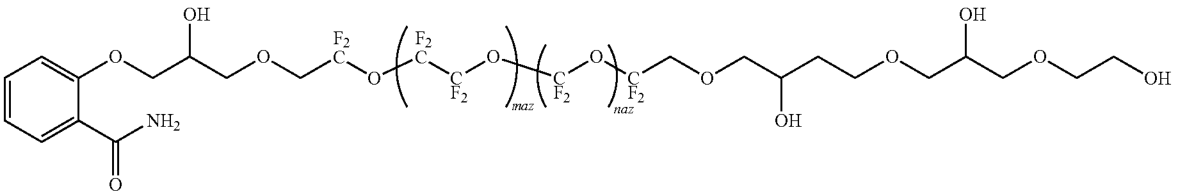

(BA)

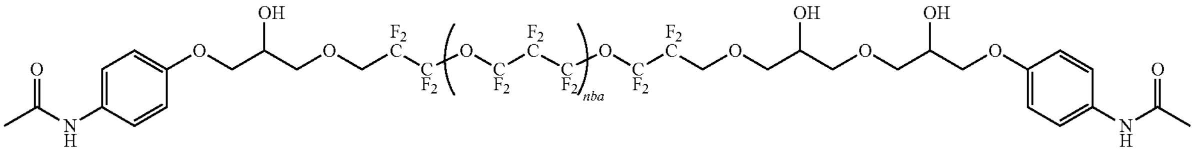

(BB)

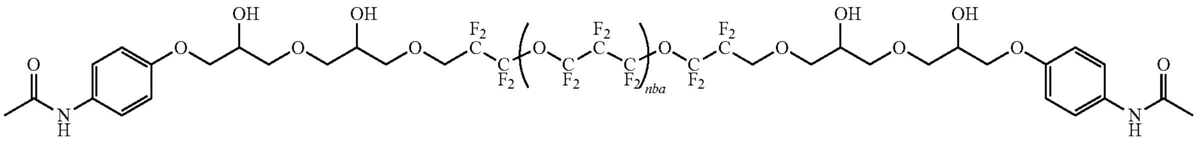

(in Formula (AY), may and nay indicate an average degree of polymerization, and each represent 1 to 30)
(in Formula (AZ), maz and naz indicate an average degree of polymerization, and each represent 1 to 30)
(in Formula (BA), nba indicates an average degree of polymerization, and represents 1 to 30)
(in Formula (BB), nbb indicates an average degree of polymerization, and represents 1 to 30)

The number-average molecular weight (Mn) of the fluorine-containing ether compound of the present embodiment is preferably in a range of 500 to 10,000, more preferably in a range of 700 to 7,000, and particularly preferably in a range of 800 to 4,000.

When the number-average molecular weight is 500 or more, the lubricant containing the fluorine-containing ether compound of the present embodiment is less likely to evaporate. Therefore, when the number-average molecular weight is 500 or more, a fluorine-containing ether compound which can form a lubricating layer in which pickup and spin-off are less likely to occur is obtained. In addition, when the number-average molecular weight is 10,000 or less, the viscosity of the fluorine-containing ether compound does not become too high and becomes a suitable viscosity for a lubricant. The number-average molecular weight of the fluorine-containing ether compound is more preferably 4,000 or less because the viscosity becomes one that makes the lubricant easy to handle.

In addition, the lubricating layer containing the fluorine-containing ether compound having a number-average molecular weight in a range of 1,000 to 3,000 has a coating rate that does not deteriorate even if the film thickness is thin, and has favorable chemical substance resistance and wear resistance. The fluorine-containing ether compound having a number-average molecular weight in a range of 1,000 to 3,000 has the best balance of performance in terms of minimizing the occurrence of pickup and spin-off in the lubricating layer containing this compound and making the lubricating layer thinner.

In the fluorine-containing ether compound of the present embodiment, the ratio of the number-average molecular weight of the PFPE chain represented by $R^2$ to the number-average molecular weight of the entire molecule (PFPE chain/entire molecule) is preferably 0.45 to 0.90 and more preferably 0.55 to 0.85. When the ratio of the number-average molecular weight is 0.45 or more, it is possible to minimize an increase in the surface free energy of the entire molecule due to a decrease in the proportion of fluorine atoms in the fluorine-containing ether compound molecule. In addition, when the ratio of the number-average molecular weight is 0.90 or less, the number of hydroxyl groups contained in $R^1$-[B]-[A]-and-[C]-[D]-$R^3$ arranged at both ends of the PEPE chain with respect to the length of the PEPE chain is appropriate. Therefore, a fluorine-containing ether compound which can form a lubricating layer having better adhesion to the protective layer is obtained.

"Production Method"

A method of producing a fluorine-containing ether compound of the present embodiment is not particularly limited, and a conventionally known production method can be used for production. The fluorine-containing ether compound of the present embodiment can be produced using, for example, the following production method.

First, a fluorine compound having a PFPE chain corresponding to $R^2$ in Formula (1) and having a hydroxymethyl group ($—CH_2OH$) arranged at both ends of the molecule is prepared.

Next, a hydroxyl group of a hydroxymethyl group arranged at one end of the fluorine compound is substituted with a group composed of $R^1$-[B]. [A]- in Formula (1) (first reaction). Then, a hydroxyl group of a hydroxymethyl group arranged at the other end is substituted with a group composed of -[C]-[D]-$R^3$ in Formula (1) (second reaction).

The first reaction and the second reaction can be performed using a conventionally known method, and can be appropriately determined according to the type of the end group in Formula (1). In addition, among the first reaction and the second reaction, either reaction may be performed first.

The fluorine-containing ether compound represented by Formula (1) is obtained by the above method.

[Lubricant for Magnetic Recording Medium]

A lubricant for a magnetic recording medium of the present embodiment contains the fluorine-containing ether compound represented by Formula (1).

The lubricant of the present embodiment can be used by being mixed with a known material used as a material for the lubricant as necessary, as long as the characteristics of the lubricant which is obtained due to the inclusion of the fluorine-containing ether compound represented by Formula (1) are not impaired.

Specific examples of known materials include, for example, FOMBLIN (registered trademark) ZDIAC, FOMBLIN ZDEAL, and FOMBLIN AM-2001 (all commercially available from Solvay Solexis), and Moresco A20H (commercially available from Moresco). A known material used in combination with the lubricant of the present embodiment preferably has a number average molecular weight of 1,000 to 10,000.

When the lubricant of the present embodiment contains a material other than the fluorine-containing ether compound represented by Formula (1), the content of the fluorine-containing ether compound represented by Formula (1) in the lubricant is preferably 50 mass % or more, and more preferably 70 mass % or more. The content of the fluorine-containing ether compound represented by Formula (1) in the lubricant may be 80 mass % or more and may be 90 masse % or more.

Since the lubricant of the present embodiment contains the fluorine-containing ether compound represented by Formula (1), it has favorable smoothness and adhesion with respect to the protective layer, and can form a lubricating layer that can minimize the occurrence of pickup and spin-off.

[Magnetic Recording Medium]

In a magnetic recording medium of the present embodiment, at least a magnetic layer, a protective layer, and a lubricating layer are sequentially provided on a substrate.

In the magnetic recording medium of the present embodiment, as necessary, one, or two or more underlayers can be provided between the substrate and the magnetic layer. In addition, an adhesive layer and/or a soft magnetic layer can be provided between the underlayer and the substrate.

The FIGURE is a schematic cross-sectional view showing a magnetic recording medium according to one embodiment of the present invention.

A magnetic recording medium 10 of the present embodiment has a structure in which an adhesive layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate in which a film made of NiP or a NiP alloy is formed on a base made of a metal or an alloy material such as Al or an Al alloy can be used.

In addition, as the substrate 11, a non-magnetic substrate made of a non-metal material such as glass, a ceramic, silicon, silicon carbide, carbon, and a resin may be used, or a non-magnetic substrate in which a film made of NiP or a NiP alloy is formed on a base of these non-metal materials may be used.

Since a glass substrate has rigidity and excellent smoothness, it is suitable for increasing the recording density. Examples of glass substrates include an aluminosilicate glass substrate. As the glass substrate, a chemically reinforced aluminosilicate glass substrate is particularly suitable.

The roughness of the main surface of the substrate 11 is preferably ultra-smooth with an Rmax of 6 nm or less and an Ra of 0.6 mm or less. Here, the surface roughnesses Rmax and Ra are based on the provisions of JIS B 0601.

"Adhesive Layer"

The adhesive layer 12 prevents the progress of corrosion of the substrate 11 that occurs when the substrate 11 and the soft magnetic layer 13 provided on the adhesive layer 12 are arranged in contact with each other.

The material of the adhesive layer 12 can be appropriately selected from among, for example, Cr, a Cr alloy, Ti, a Ti alloy, CrTi, NiAl, and an AlRu alloy. The adhesive layer 12 can be formed by, for example, a sputtering method.

"Soft Magnetic Layer"

The soft magnetic layer 13 preferably has a structure in which a first soft magnetic film, an intermediate layer made of a Ru film, and a second soft magnetic film are sequentially laminated. That is, the soft magnetic layer 13 preferably has a structure in which an intermediate layer made of a Ru film is interposed between two soft magnetic film layers, and thus, the soft magnetic films above and below the intermediate layer are bonded by anti-ferromagnetic coupling (AFC).

Examples of materials of the first soft magnetic film and the second soft magnetic film include a CoZrTa alloy and a CoFe alloy.

It is preferable to add any of Zr, Ta, and Nb to the CoFe alloy used for the first soft magnetic film and the second soft magnetic film. Thereby, the amorphization of the first soft magnetic film and the second soft magnetic film is promoted. As a result, the orientation of the first underlayer (seed layer) can be improved, and the floating height of the magnetic head can be reduced.

The soft magnetic layer 13 can be formed by, for example, a sputtering method.

"First Underlayer"

The first underlayer 14 is a layer for controlling the orientations and crystal sizes of the second underlayer 15 and the magnetic layer 16 provided thereon.

Examples of the first underlayer 14 include a Cr layer, a Ta layer, a Ru layer, a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the orientation of the magnetic layer 16 such that it becomes favorable. The second underlayer 15 is preferably a layer made of Ra or a Ru alloy.

The second underlayer 15 may be a single layer or may be composed of #plurality of layers. When the second underlayer 15 is composed of a plurality of layers, all of the layers may be composed of the same material, or at least one layer may be composed of a different material.

The second underlayer 15 can be formed by, for example, a sputtering method.

"Magnetic Layer"

The magnetic layer 16 is made of a magnetic film in which the axis of easy magnetization is in a direction perpendicular or horizontal to the surface of the substrate. The magnetic layer 16 is a layer containing Co and Pt. The magnetic layer 16 may be a layer containing an oxide, Cr, B, Co, Ta, Zr, or the like in order to improve signal to noise ratio (SNR) characteristics.

Examples of oxides contained in the magnetic layer 16 include $SiO_2$, SiO, $Cr_2O_3$, CoO, $Ta_2O_3$, and $TiO_2$.

The magnetic layer 16 may be composed of a single layer or may be composed of a plurality of magnetic layers made of materials with different compositions.

For example, when the magnetic layer 16 is composed of three layers including a first magnetic layer, a second magnetic layer, and a third magnetic layer sequentially laminated from below, the first magnetic layer preferably has a granular structure made of a material containing Co, Cr, and Pt, and further containing an oxide. As the oxide contained in the first magnetic layer, for example, it is preferable to use an oxide of Cr, Si, Ta, Al, Ti, Mg, Co, or the like. Among these, particularly, $TiO_2$, $Cr_2O_3$, $SiO_2$, or the like can be preferably used. In addition, the first magnetic layer is preferably made of a composite oxide in which two or more oxides are added. Among these, particularly, $Cr_2O_3$—$SiO_2$, $CH_2O_3$—$TiO_2$, $SiO_2$—$TiO_2$, or the like can be preferably used.

The first magnetic layer can contain one or more elements selected from among B, Ta, Mo, Cu, Nd, W, Nb, Sm, Tb, Ru, and Re in addition to Co, Cr, Pt, and an oxide.

For the second magnetic layer, the same material as for the first magnetic layer can be used. The second magnetic layer preferably has a granular structure.

The third magnetic layer preferably has a non-granular structure made of a material containing Co, Cr, and Pt, and not containing an oxide. The third magnetic layer can contain one or more elements selected from among B, Ta, Mo, Cu, Nd, W, Nh, Sm, Tb, Ru, Re, and Ma in addition to Co, Cr, and Pt.

When the magnetic layer 16 is formed of a plurality of magnetic layers, it is preferable to provide a non-magnetic layer between adjacent magnetic layers. When the magnetic layer 16 is composed of three layers including a first magnetic layer, a second magnetic layer, and a third magnetic layer, it is preferable to provide a non-magnetic layer between the first magnetic layer and the second magnetic layer and between the second magnetic layer and the third magnetic layer.

For the non-magnetic layer provided between adjacent magnetic layers of the magnetic layer 16, for example, Ru, a Ru alloy, a CoCr alloy, a CoCrX1 alloy (X1 represents one, or two or more elements selected from among Pt, Ta, Zr, Re, Ru, Cu, Nb, Ni, Mn, Ge, Si, O, N, W, Mo, Ti, V, and B), or the like can be preferably used.

For the non-magnetic layer provided between adjacent magnetic layers of the magnetic layer 16, it is preferable to use an alloy material containing an oxide, a metal nitride, or a metal carbide. Specifically, as the oxide, for example, $SiO_2$, $Al_2O_3$, $Ta_2O_5$, $Cr_2O_3$, MgO, $Y_2O_5$, $TiO_2$, or the like can be used. As the metal nitride, for example, AlN, $Si_3N_4$, TaN, CrN, or the like can be used. As the metal carbide, for example, TaC, BC, SiC, or the like can be used.

The non-magnetic layer can be formed by, for example, a sputtering method.

The magnetic layer 16 is preferably a magnetic layer for perpendicular magnetic recording in which the axis of easy magnetization is in a direction perpendicular to the surface of the substrate in order to realize a higher recording density. The magnetic layer 16 may be a magnetic layer for in-plane magnetic recording.

The magnetic layer 16 may be formed by any conventionally known method such as a vapor deposition method, an ion beam sputtering method, and a magnetron sputtering method. The magnetic layer 16 is generally formed by a sputtering method.

"Protective Layer"

The protective layer 17 protects the magnetic layer 16. The protective layer 17 may be composed of one layer or may be composed of a plurality of layers. Examples of materials of the protective layer 17 include carbon, nitrogen-containing carbon, and silicon carbide.

As the protective layer 17, a carbon-based protective layer can be preferably used, and an amorphous carbon protective layer is particularly preferable. When the protective layer 17 is a carbon-based protective layer, this is preferable because the interaction with the polar group (particularly the hydroxyl group) contained in the fluorine-containing ether compound in the lubricating layer 18 is further improved.

The adhesive force between the carbon-based protective layer and the lubricating layer 18 can be controlled by forming the carbon-based protective layer with hydrogenated carbon and/or nitrogenated carbon and adjusting the hydrogen content and/or nitrogen content in the carbon-based protective layer. The hydrogen content in the carbon-based protective layer measured by a hydrogen forward scattering method (HRS) is preferably 3 atom % to 20 atom %. In addition, the nitrogen content in the carbon-based protective layer measured through X-ray photoelectron spectroscopy (XPS) is preferably 4 atom % to 15 atom %.

Hydrogen and/or nitrogen contained in the carbon-based protective layer need not be uniformly contained through the entire carbon-based protective layer. For example, the carbon-based protective layer is preferably formed as a composition gradient layer in which nitrogen is contained in the protective layer 17 on the side of the lubricating layer 18 and hydrogen is contained in the protective layer 17 on the side of the magnetic layer 16. In this case, the adhesive force between the magnetic layer 16 and the lubricating layer 18, and the carbon-based protective layer is further improved. This is because nitrogen in the protective layer 17 acts as an active site and promotes bonding with the lubricating layer 18. Hydrogen or nitrogen in the carbon-based protective layer acts as an active site.

The film thickness of the protective layer 17 is preferably 1 nm to 7 nm. When the film thickness of the protective layer 17 is 1 nm or more, the performance of the protective layer 17 can be sufficiently obtained. The film thickness of the protective layer 17 is preferably 7 nm or less in order to reduce the thickness of the protective layer 17.

As a film formation method for the protective layer 17, a sputtering method using a target material containing carbon, a chemical vapor deposition (CVD) method using a hydrocarbon raw material such as ethylene or toluene, an ion beam deposition (IBD) method, or the like can be used.

When a carbon-based protective layer is formed as the protective layer 17, for example, a film can be formed by a DC magnetron sputtering method. Particularly, when a carbon-based protective layer is formed as the protective layer 17, it is preferable to form an amorphous carbon protective layer by a plasma CVD method. The amorphous carbon protective layer formed by the plasma CVD method has uniform surfaces and low roughness.

"Lubricating Layer"

The lubricating layer 18 prevents contamination of the magnetic recording medium 10. In addition, the lubricating layer 18 reduces a frictional force of a magnetic head of a magnetic recording and reproducing device, which slides on the magnetic recording medium 10, and improves the durability of the magnetic recording medium 10.

As shown in the FIGURE, the lubricating layer 18 is formed on and in contact with the protective layer 17. The lubricating layer 18 contains the above fluorine-containing ether compound.

When the protective layer 17 arranged below the lubricating layer 18 is a carbon-based protective layer, particularly, the lubricating layer 18 is bonded to the protective layer 17 with a high bonding force. As a result, even if the thickness of the lubricating layer 18 is thin, it is easy to obtain the magnetic recording medium 10 in which the surface of the protective layer 17 is covered at a high coating rate, and it is possible to effectively prevent contamination of the surface of the magnetic recording medium 10.

The average film thickness of the lubricating layer 18 is preferably 0.5 nm (5 Å) to 2.0 nm (20 Å), and more preferably 0.5 nm (5 Å) to 1.0 nm (10 Å). When the average film thickness of the lubricating layer 18 is 0.5 nm or more, the lubricating layer 18 is formed with a uniform film thickness without forming an island shape or a mesh shape. Therefore, the surface of the protective layer 17 can be coated with the lubricating layer 18 at a high coating rate. In addition, when the average film thickness of the lubricating layer 18 is 2.0 nm or less, the lubricating layer 18 can be made a sufficiently thin film, and the floating height of the magnetic head can be sufficiently reduced.

When the surface of the protective layer 17 is not covered with the lubricating layer 18 at a sufficiently high coating rate, an environmental substance adsorbed to the surface of the magnetic recording medium 10 passes through voids in the lubricating layer 18 and intrudes under the lubricating layer 18. The environmental substance that has intruded under the lubricating layer 18 is adsorbed and bonded to the protective layer 17 and produces a contamination substance. Then, during magnetic recording and reproducing, the contamination substance (aggregated component) adheres (transfers) to a magnetic head as a smear to break the magnetic head or degrade magnetic recording and reproducing characteristics of magnetic recording and reproducing devices.

Examples of environmental substances that produce contamination substances include siloxane compounds (cyclic siloxane and linear siloxane), ionic impurities, hydrocarbons having a relatively high molecular weight such as octacosanes, and plasticizers such as dioctyl phthalate. Examples of metal ions that are contained in ionic impurities include sodium ions and potassium ions. Examples of inorganic ions contained in ionic impurities include chloride ions, bromide ions, nitrate ions, sulfate ions, and ammonium ions. Examples of organic ions contained in ionic impurities include oxalate ions and formate ions.

"Method of Forming Lubricating Layer"

As a method of forming the lubricating layer 18, for example, a method in which a magnetic recording medium is prepared during production in which respective layers up to the protective layer 17 are formed on the substrate 11, and a lubricating layer forming solution is applied onto the protective layer 17 and dried may be exemplified.

For example, the lubricating layer forming solution can be obtained by dispersing and dissolving the lubricant for a magnetic recording medium of the embodiment described above in a solvent as necessary, and adjusting the viscosity and concentration to be suitable for application methods.

Examples of solvents used for the lubricating layer forming solution include fluorine-based solvents such as Vertrel (registered trademark) XF (product name, commercially available from Du Pont-Mitsui Fluorochemicals Co., Ltd.).

The method of applying the lubricating layer forming solution is not particularly limited, and examples thereof include a spin coating method, a spraying method, a paper coating method, and a dipping method.

When the dipping method is used, for example, the following method can be used. First, the substrate 11 in which respective layers up to the protective layer 17 are formed is immersed in the lubricating layer forming solution contained in an immersion tank of a dip coating device. Next, the substrate 11 is lifted from the immersion tank at a predetermined speed. Accordingly, the lubricating layer forming solution is applied to the surface of the protective layer 17 of the substrate 11.

When the dipping method is used, the lubricating layer forming solution can be uniformly applied to the surface of the protective layer 17, and the lubricating layer 18 with a uniform film thickness can be formed on the protective layer 17.

In the present embodiment, the substrate 11 in which the lubricating layer 18 is formed is preferably subjected to a thermal treatment. When the thermal treatment is performed, the adhesion between the lubricating layer 18 and the protective layer 17 is improved, and the adhesive force between the lubricating layer 18 and the protective layer 17 is improved.

The thermal treatment temperature is preferably 100° C. to 180° C., When the thermal treatment temperature is 100° C. or higher, an effect of improving the adhesion between the lubricating layer 18 and the protective layer 17 is sufficiently obtained. In addition, when the thermal treatment temperature is 180° C. or lower, it is possible to prevent thermal decomposition of the lubricating layer 18 due to the thermal treatment. The thermal treatment time is preferably 10 minutes to 120 minutes.

In the present embodiment, in order to further improve the adhesive force of the lubricating layer 18 with respect to the protective layer 17, an ultraviolet ray (UV) emitting treatment may be performed on the lubricating layer 18 of the substrate 11 before the thermal treatment or after the thermal treatment.

In the magnetic recording medium 10 of the present embodiment, at least the magnetic layer 16, the protective layer 17, and the lubricating layer 18 are sequentially provided on the substrate 11. In the magnetic recording medium 10 of the present embodiment, the lubricating layer 18 containing the above fluorine-containing ether compound is formed on and in contact with the protective layer 17. The lubricating layer 18 has favorable smoothness and adhesion with respect to the protective layer 17 and can minimize the occurrence of pickup and spin-off. Therefore, the magnetic recording medium 10 of the present embodiment has excellent floating stability of the magnetic head.

In addition, since the magnetic recording medium 10 of the present embodiment has the lubricating layer 18 in which pickup is less likely to occur, it is possible to further reduce the magnetic spacing. In addition, since the magnetic recording medium 10 of the present embodiment has the lubricating layer 18 in which spin-off is less likely to occur, it is possible to increase the rotational speed of the magnetic recording medium. Accordingly, the magnetic recording medium 10 of the present embodiment can contribute to improving the recording density and increasing the capacity of the magnetic recording medium. Therefore, the magnetic recording medium 10 of the present embodiment is particularly suitable as a magnetic disk mounted in a load/unload type (LUL type) magnetic disk device.

Meanwhile, conventional magnetic recording media have problems in that, since the adhesion of the lubricating layer to the protective layer is insufficient, when the magnetic spacing is reduced, pickup is more likely to occur, and when the rotational speed of the magnetic recording medium increases, spin-off is more likely to occur. Therefore, in conventional magnetic recording media, it is difficult to reduce the magnetic spacing and to increase the rotational speed of the magnetic recording medium while maintaining reliability and durability.

EXAMPLES

Hereinafter, the present invention will be described in more detail with reference to examples and comparative examples. Here, the present invention is not limited only to the following examples.

[Nuclear Magnetic Resonance (NMR) Measurement Method]

The structures of the compounds produced in the following examples and comparative examples were identified based on the results obtained by performing $^{1}$H-NMR measurement and $^{19}$F-NMR measurement using an NMR device (AVANCEIII-400), which is commercially available from Bruker BioSpin.

For NMR measurement, about 10 mg of a sample that was weighed out and dissolved in about 0.5 mL of heavy acetone (hexafluorobenzene was added as a reference substance) was used. The $^{1}$H-NMR chemical shift reference was 2.05 ppm for the acetone peak. The $^{19}$F-NMR chemical shift reference was −164.7 ppm for the hexafluorobenzene peak.

The number-average molecular weight (Mn) of each compound was calculated from the $^{19}$F-NMR measurement results. Specifically, the number of repeating units of the PFPE chain was calculated from the integrated intensity of fluorine atom measured through $^{19}$F-NMR, and the number-average molecular weight of the PEPE chain and the number-average molecular weight of entire molecule for each compound were obtained, and the ratio thereof (PFPE ratio=PFPE chain Mn/entire molecule Mn) was calculated.

Example 1

A compound (AA) represented by Formula (AA) (in Formula (AA), maa indicating an average degree of polymerization is 6.2 and naa indicating an average degree of polymerization is 6.2) was obtained by the following method.

First, 2-hydroxybenzamide and epibromohydrin were reacted to synthesize a compound represented by the following Formula (11-1). In addition, ethylene glycol monoallyl ether and 3,4-dihydro-2H-pyran were reacted to protect the hydroxyl group with a tetrahydropyranyl group, and the double bond was then oxidized with meta-chloroperoxybenzoic acid to synthesize a compound represented by the following Formula (12-1).

(11-1)

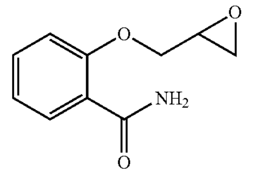

(12-1)

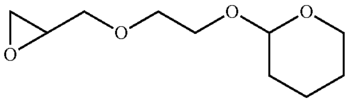

A fluoropolyether (a member-average molecular weight of 1,300 and a molecular weight distribution of 1.1) represented by $HOCH_2CF_2O(CF_2CF_2O)_u(CF_2O)_vCF_2CH_2OH$ (in the formula, u indicating an average degree of polymerization is 6.2 and v indicating an average degree of polymerization is 6.2) (40.0 g), a compound represented by Formula (11-1) (3.57 g), and t-BuOH (tert-butyl alcohol) (40.0 mL) were put into a 200 mL eggplant flask under a nitrogen gas atmosphere and were stirred until the mixture became uniform at room temperature. In addition, t-BuOK (potassium tert-butoxide) (1.04 g) was put into the eggplant flask, and the mixture was heated to 70° C., stirred for 12 hours to perform the reaction.

Then, the obtained reaction product was cooled to 25° C., water was added, ethyl acetate was additionally added as a solvent, the organic layer thereof was extracted, and washing with water was performed. Anhydrous sodium sulfate was added to the organic layer for dehydration, the drying agent was removed by filtration, and the filtrate was then concentrated. The residue was purified by silica gel column chromatography, and thereby a compound represented by the following Formula (13-1) (18.4 g) was obtained.

(13-1)

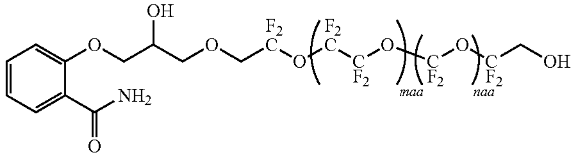

(in Formula (13-1), maa indicating an average degree of polymerization is 6.2 and naa indicating an average degree of polymerization is 6.2).

A compound represented by Formula (13-1) (18.4 g), a compound represented by Formula (12-1) (2.74 g), and t-BuOH (tert-butyl alcohol) (65.0 mL) were put into a 200 mL eggplant flask under a nitrogen gas atmosphere and were stirred until the mixture became uniform at room temperature. In addition, t-BuOK. (potassium tert-butoxide) (0.41 g) was put into the eggplant flask, and the mixture was heated to 70° C., stirred for 16 hours to perform the reaction.

Then, the obtained reaction product was cooled to 25° C., a 7% hydrogen chloride/methanol reagent (64.1 g) was added, the mixture was stirred at room temperature for 3 hours, and a deprotection reaction was performed.

The obtained reaction product was added to 7% sodium bicarbonate water (250 mL) for neutralization, ethyl acetate was then added, the organic layer thereof was extracted, and washing with water was performed. Anhydrous sodium sulfate was added to the organic layer for dehydration, the drying agent was removed by filtration, and the filtrate was then concentrated. The residue was purified by silica gel column chromatography, and thereby 13.9 g of a compound (AA) was obtained.

$^1$H-NMR and $^{19}$F-NMR measurement of the obtained compound (AA) were performed, and the structure was identified from the following results.

$^1$H-NMR (acetone-$d_6$): δ [ppm]=3.40-4.00 (11H), 4.10-4.80 (10H), 6.50-6.70 (TH), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 2

A compound (AB) represented by Formula (AB) (in Formula (AB), nab indicating an average degree of polymerization is 9.7) was obtained by the following method.

14.2 g of a compound (AB) was obtained in the same operation as in Example 1 except that, instead of the fluoropolyether (a number-average molecular weight of 1,300 and a molecular weight distribution of 1.1) represented by $HOCH_2CF_2O)(CF_2CF_2O)_u(CF_2O)_vCF_2CH_2OH$ (in the formula, u indicating an average degree of polymerization is 6.2 and v indicating an average degree of polymerization is 6.2) in Example 1, a fluoropolyether (a number-average molecular weight of 1,300 and a molecular weight distribution of 1.1) represented by $HOCH_2CF_2O(CF_2CF_2O)_zCF_2CH_2OH$ (in the formula, z indicating an average degree of polymerization is 9.7) (40.0 g) was used, $^1$H-NMR and $^{19}$F-NMR measurement of the obtained compound (AB) were performed, and the structure was identified from the following results.

$^1$H-NMR (acetone-$d_6$): δ [ppm]=3.40-4.00 (11H), 4.10-4.80 (10H), 6.50-6.70 (1H), 7.00-8.10 (5H)

$^{19}$F-NMR (acetone-$d_6$): δ [ppm]=−78.57 (4F), −88.92 to −89.57 (38.8F)

Example 3

A compound (AC) represented by Formula (AC) (in Formula (AC), nac indicating an average degree of polymerization is 6.2) was obtained by the following method.

13.6 g of a compound (AC) was obtained in the same operation as in Example 1 except that, instead of the fluoropolyether (a number-average molecular weight of 1,300 and a molecular weight distribution of 1.1) represented by $HOCH_2CF_2O(CF_2CF_2O)_u(CF_2O)_vCF_2CH_2OH$ (in the formula, u indicating an average degree of polymerization is 6.2 and v indicating an average degree of polymerization is 6.2) in Example 1, a fluoropolyether (a number-average molecular weight of 1.300 and a molecular weight distribution of 1.1) represented by $HOCH_2CF_2CF_2O(CF_2CF_2CF_2O)_xCF_2CF_2CH_2OH$ (in the formula, x indicating an average degree of polymerization is 6.2) (40.0 g) was used.

$^1$H-NMR and $^{19}$F-NMR measurement of the obtained compound (AC) were performed, and the structure was identified from the following results.

$^1$H-NMR (acetone-$d_6$): δ [ppm]=3.40-4.00 (11H), 4.10-4.80 (10H), 6.50-6.70 (1H), 7.00-8.10 (5H)

$^{19}$F-NMR (acetone-$d_6$): δ [ppm]=−84.22 (24.8F), −86.40 (4F), −124.30 (4F), −130.08 (12.4F)

Example 4

A compound (AD) represented by Formula (AD) (in Formula (AD), nad indicating an average degree of polymerization is 4.3) was obtained by the following method.

14.2 g of a compound (AD) was obtained in the same operation as in Example 1 except that, instead of the fluoropolyether (a number-average molecular weight of 1,300 and a molecular weight distribution of 1.1) represented by $HOCH_2CF_2O(CF_2CF_2O)_u(CF_2O)_vCF_2CH_2OH$ (in the formula, u indicating an average degree of polymerization is 6.2 and v indicating an average degree of polymerization is 6.2) in Example 1, a fluoropolyether (a number-average molecular weight of 1,300 and a molecular weight distribution of 1.1) represented by $HOCH_2CF_2CF_2CF_2O(CF_2CF_2CF_2O)_yCF_2CF_2CF_2CH_2OH$ (in the formula, y indicating an average degree of polymerization is 4.3) (40.0 g) was used.

$^1$H-NMR and $^{19}$F-NMR measurement of the obtained compound (AD) were performed, and the structure was identified from the following results.

$^1$H-NMR (acetone-$d_6$): δ [ppm]=3.40-4.00 (11H), 4.10-4.80 (10H), 6.50-6.70 (1H), 7.00-8.10 (5H)

$^{19}$F-NMR (acetone-$d_6$): δ [ppm]=−83.70 (21.2F), −123.32 (4F), −125.85 (17.2F), −127.63 (4F)

Example 5

A compound (AE) represented by Formula (AE) (in Formula (AE), mae indicating an average degree of polymerization is 6.2 and nae indicating an average degree of polymerization is 6.2) was obtained by the following method.

First, 3-hydroxybenzamide and epibromohydrin were reacted to synthesize a compound represented by the following Formula (11-2).

(11-2)

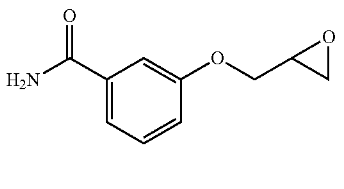

13.2 g of a compound (AB) was obtained in the same operation as in Example 1 except that, instead of the compound (11-1) represented by Formula (11-1) used in Example 1, a compound (11-2) represented by Formula (11-2) (3.57 g) was used.

$^1$H-NMR and $^{19}$F-NMR measurement of the obtained compound (AB) were performed, and the structure was identified from the following results.

$^1$H-NMR (acetone-$d_6$): δ [ppm]=3.40-4.00 (11H), 4.10-4.80 (10H), 6.50-6.70 (1H), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 6

A compound (AF) represented by Formula (AF) (in Formula (AF), maf indicating an average degree of polymerization is 6.2 and naf indicating an average degree of polymerization is 6.2) was obtained by the following method.

First, 4-hydroxybenzamide and epibromohydrin were reacted to synthesize a compound represented by the following Formula (11-3).

(11-3)

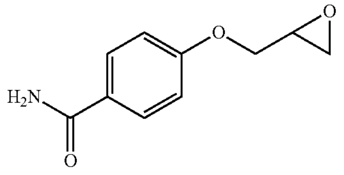

14.5 g of a compound (AF) was obtained in the same operation as in Example 1 except that, instead of the compound (11-1) represented by Formula (11-1) used in Example 1, a compound (11-3) represented by Formula (11-3) (3.57 g) was used.

$^1$H-NMR and $^{19}$F-NMR measurement of the obtained compound (AF) were performed, and the structure was identified from the following results.

$^1$H-NMR (acetone-$d_6$): δ [ppm]=3.40-4.00 (11H), 4.10-4.80 (10H), 6.50-6.70 (1H), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 7

A compound (AC) represented by Formula (AG) (in Formula (AG), mag indicating an average degree of polymerization is 6.2 and nag indicating an average degree of polymerization is 6.2) was obtained by the following method.

First, 6-hydroxy-2-naphthalenecarboxamide and epibromohydrin were reacted to synthesize a compound represented by the following Formula (11-4).

(11-4)

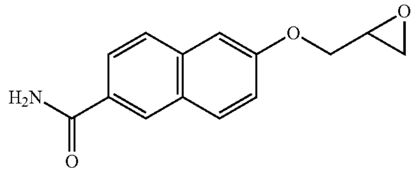

14.3 g of a compound (AG) was obtained in the same operation as in Example 1 except that, instead of the compound (11-1) represented by Formula (11-1) used in Example 1, a compound (11-4) represented by Formula (11-4) (4.49 g) was used.

$^1$H-NMR and $^{19}$F-NMR measurement of the obtained compound (AG) were performed, and the structure was identified from the following results.

$^1$H-NMR (acetone-$d_6$): δ [ppm]=3.40-4.00 (11H), 4.10-4.80 (10H), 6.50-6.70 (1H), 7.00-8.10 (7H)

$^{19}$F-NMR (acetone-$d_6$): δ [ppm]=−51.99 to −55.72 (12.4F), −78.48 (2F), −80.66 (2F), −89.16 to −91.14 (24.8F)

Example 8

A compound (AH) represented by Formula (AH) (in Formula (AH), mah indicating an average degree of polymerization is 6.2 and nab indicating an average degree of polymerization is 6.2) was obtained by the following method.

First, a compound obtained by reacting methyl 4-hydroxybenzoate and heptylamine was reacted with epibromohydrin to synthesize a compound represented by the following Formula (11-5).

(11-5)

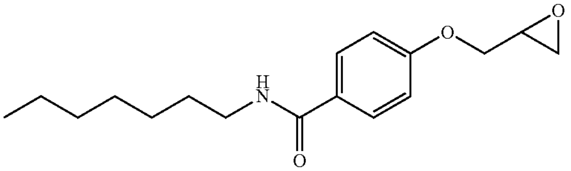

14.7 g of a compound (AH) was obtained in the same operation as in Example 1 except that, instead of the compound (11-1) represented by Formula (11-1) used in Example 1, a compound. (11-5) represented by Formula (11-5) (5.38 g) was used.

$^1$H-NMR and $^{19}$F-NMR measurement of the obtained compound (AH) were performed, and the structure was identified from the following results.

$^1$H-NMR (acetone-$d_6$): δ [ppm]=0.95 (3H), 1.20-1.60 (10H), 3.40-4.00 (13H), 4.10-4.80 (10H), 6.50-6.70 (1H), 7.00-8.10 (4H)

$^{19}$F-NMR (acetone-$d_6$): δ [ppm]=−51.99 to −55.72 (12.4F), −78.48 (2F), −80.66 (2F), −89.16 to −91.14 (24.8F)

Example 9

A compound (AI) represented by Formula (AI) (in Formula (AI), mai indicating an average degree of polymerization is 6.2 and nai indicating an average degree of polymerization is 6.2) was obtained by the following method.

First, a compound obtained by reacting methyl 4-hydroxybenzoate and dipropylamine was reacted with epibromohydrin to synthesize a compound represented by the following Formula (11-6).

(11-6)

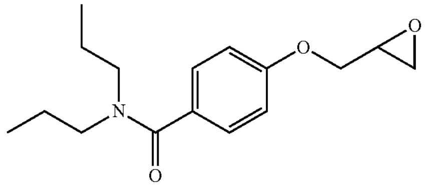

14.6 g of a compound (AI) was obtained in the same operation as in Example 1 except that, instead of the compound (11-1) represented by Formula (11-1) used in Example 1, a compound (11-6) represented by Formula (11-6) (5.12 g) was used.

$^1$H-NMR and #F-NMR measurement of the obtained compound (AI) were performed, and the structure was identified from the following results.

$^1$H-NMR (acetone-$d_6$): δ [ppm]=0.98 (6H), 1.41 (4H), 3.40-4.00 (15H), 4.10-4.80 (10H), 7.00-8.10 (4H)

$^{19}$F-NMR (acetone-$d_6$): δ [ppm]=−51.99 to −55.72 (12.4F), −78.48 (2F), 66 (2F), −89.16 to −91.14 (24.8F)

Example 10

A compound (AJ) represented by Formula (AJ) (in Formula (AJ), maj indicating an average degree of polymerization is 6.2 and naj indicating an average degree of polymerization is 6.2) was obtained by the following method.

First, 4-(1-piperidinylcarbonyl) phenol and epibromohydrin were reacted to synthesize a compound represented by the following Formula (11-7).

(11-7)

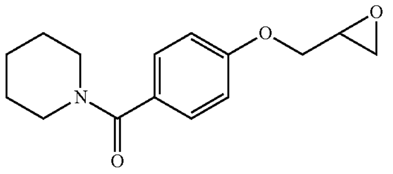

14.5 g of a compound (AJ) was obtained in the same operation as in Example 1 except that, instead of the compound (11-1) represented by Formula (11-1) used in Example 1, a compound (11-7) represented by Formula (11-7) (4.82 g) was used.

$^1$H-NMR and $^{19}$F-NMR measurement of the obtained compound (AJ) were performed, and the structure was identified from the following results.

$^1$H-NMR (acetone-$d_6$): δ [ppm]=1.42 (6H), 2.82-3.25 (4H), 3.40-4.00 (11H), 4.10-4.80 (10H), 7.00-8.10 (4H)

$^{19}$F-NMR (acetone-$d_6$): δ [ppm]=−51.99 to −55.72 (12.4F), −78.48 (2F), −80.66 (2F), −89.16 to 91.14 (24.8F)

Example 11

A compound (AK) represented by Formula (AK) (in Formula (AK), mak indicating an average degree of polymerization is 6.2 and nak indicating an average degree of polymerization is 6.2) was obtained by the following method.

First, 4'-hydroxyacetanilide and epibromohydrin were reacted to synthesize a compound represented by the following Formula (11-8).

(11-8)

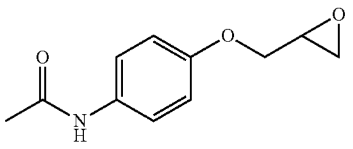

14.0 g of a compound (AK) was obtained in the same operation as in Example 1 except that, instead of the compound (11-1) represented by Formula (11-1) used in Example 1, a compound (11-8) represented by Formula (11-8) (3.83 g) was used.

1H-NMR and $^{19}$F-NMR measurement of the obtained compound (AK) were performed, and the structure was identified from the following results.

$^1$H-NMR (acetone-$d_6$): δ [ppm]=2.09 (3H), 3.40-4.00 (11H), 4.10-4.80 (10H), 6.50-7.50 (41), 9.00 (1H)

$^{19}$F-NMR (acetone-$d_6$): δ [ppm]=−51.99 to −55.72 (12.4F), −78.48 (2F), −80.66 (2F), −89.16 to −91.14 (24.8F)

Example 12

A compound (AL) represented by Formula (AL) (in Formula (AL), mal indicating an average degree of polymerization is 6.2 and nal indicating an average degree of polymerization is 6.2) was obtained by the following method.

First, a compound obtained by reacting 4-aminophenol and n-octanoic acid was reacted with epibromohydrin to synthesize a compound represented by the following Formula (11-9).

(11-9)

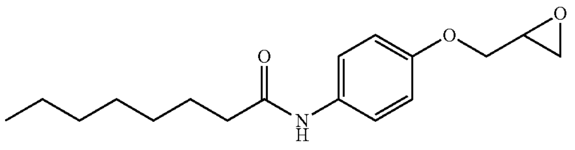

14.7 g of a compound (AL) was obtained in the same operation as in Example 1 except that, instead of the compound (11-1) represented by Formula (11-1) used in Example 1, a compound (11-9) represented by Formula (11-9) (5.38 g) was used.

$^1$H-NMR and $^{19}$F-NMR measurement of the obtained compound (AL) were performed, and the structure was identified from the following results.

$^1$H-NMR. (acetone-$d_6$): δ [ppm]=0.95 (3H), 1.20-1.60 (10H), 3.40-4.00 (13H), 4.10-4.80 (10H), 6.50-7.50 (4H), 9.00 (TH)

$^{19}$F-NMR (acetone-$d_6$): δ [ppm]=−51.99 to −55.72 (12.4F), −78.48 (2F), −80.66 (2F), −89.16 to −91.14 (24.8F)

Example 13

A compound (AM) represented by Formula (AM) (in Formula (AM), mam indicating an average degree of polymerization is 6.2 and nam indicating an average degree of polymerization is 6.2) was obtained by the following method.

First, 4'-hydroxyacetanilide and benzyl bromide were reacted to protect a phenolic hydroxyl group with benzyl, and were then reacted with 1-bromohexane in the presence of sodium hydride. The benzyl group of the obtained compound was deprotected with a hydrogen chloride/methanol reagent and was then reacted with epibromohydrin to synthesize a compound represented by the following Formula (11-10).

(11-10)

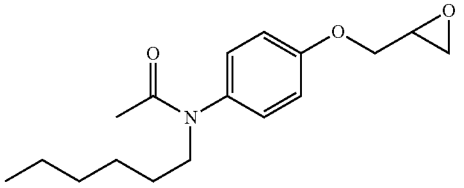

14.8 g of a compound (AM) was obtained in the same operation as in Example 1 except that, instead of the compound (11-1) represented by Formula (11-1) used in Example 1, a compound (11-10) represented by Formula (11-10) (5.38 g) was used, $^1$H-NMR and $^{19}$F-NMR measurement of the obtained compound (AM) were performed, and the structure was identified from the following results.

$^1$H-NMR (acetone-$d_6$): δ [ppm]=0.95 (3H), 1.20-1.60 (8H), 2.09 (3H), 3.40-4.00 (13H), 4.10-4.80 (10H), 6.50-7.50 (4H)

$^{19}$F-NMR (acetone-$d_6$): δ [ppm]=−51.99 to −55.72 (12.4F), −78.48 (2F), −80.66 (2F), −89.16 to −91.14 (24.8F)

Example 14

A compound (AN) represented by Formula (AN) (in Formula (AN), man indicating an average degree of polymerization is 6.2 and nan indicating an average degree of polymerization is 6.2) was obtained by the following method.

First, N-(2-hydroxyethyl)benzamide and epibromohydrin were reacted to synthesize a compound represented by the following Formula (11-11).

(11-11)

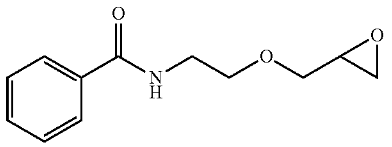

14.1 g of a compound (AN) was obtained in the same operation as in Example 1 except that, instead of the compound (11-1) represented by Formula (11-1) used in Example 1, a compound (11-11) represented by Formula (11-11) (4.08 g) was used, H-NMR and $^{19}$F-NMR measure the obtained compound (AN) were performed, and the structure was identified from the following results.

$^1$H-NMR (acetone-$d_6$): δ [ppm]=3.40-4.00 (15H), 4.10-4.80 (10H), 7.20-8.00 (5H), 8.50 (1H)

$^{19}$F-NMR (acetone-$d_6$): δ [ppm]=−51.99 to −55.72 (12.4F), −78.48 (2F), −80.66 (2F), −89.16 to −91.14 (24.8F)

Example 15

A compound (AO) represented by Formula (AO) (in Formula (AO), mao indicating an average degree of polymerization is 6.2 and nao indicating an average degree of polymerization is 6.2) was obtained by the following method.

First, a compound obtained by reacting benzoic acid and 6-amino-1-hexanol was reacted with epibromohydrin to synthesize a compound represented by the following Formula (11-12).

(11-12)

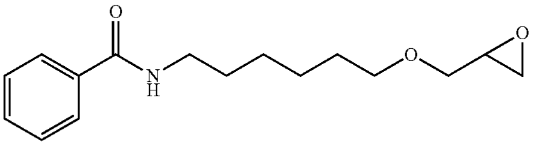

14.6 g of a compound (AQ) was obtained in the same operation as in Example 1 except that, instead of the compound (11-1) represented by Formula (11-1) used in 3. Example 1, a compound (11-12) represented by Formula (11-12) (5.12 g) was used.

$^1$H-NMR and $^{19}$F-NMR measurement of the obtained compound (AQ) were performed, and the structure was identified from the following results.

$^1$H-NMR (acetone-$d_6$): δ [ppm]=1.20-1.40 (8H), 3.40-4.00 (15H), 4.10-4.80 (10H), 7.20-8.00 (5H), 8.50 (1H)

$^{19}$F-NMR (acetone-$d_6$): δ [ppm]=−51.99 to −55.72 (12.4F), −78.48 (2F), −80.66 (2F), −89.16 to −91.14 (24.8F)

Example 16

A compound (AP) represented by Formula (AP) (in Formula (AP), map indicating an average degree of polymerization is 6.2 and nap indicating an average degree of polymerization is 6.2) was obtained by the following method.

First, a compound obtained by reacting 4-hexoylbenzoic acid and 2-aminoethanol was reacted with epibromohydrin to synthesize a compound represented by the following Formula (11-13).

(11-13)

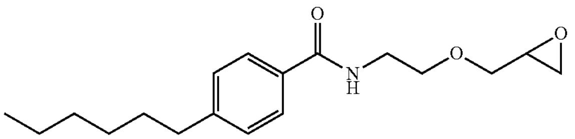

14.9 g of a compound (AP) was obtained in the same operation as in Example 1 except that, instead of the compound (11-1) represented by Formula (11-1) used in Example 1, a compound (11-13) represented by Formula (11-13) (5.64 g) was used, $^1$H-NMR and $^{19}$F-NMR measure the obtained compound (AP) were performed, and the structure was identified from the following results.

$^1$H-NMR (acetone-$d_6$): δ [ppm]=0.86 (3H), 1.18-1.61 (8H), 2.56 (2H) 3:40-4.00 (15H), 4.10-4.80 (10H), 7.20-8.00 (5H), 8.50 (1H)

$^{19}$F-NMR (acetone-$d_6$): δ [ppm]=51.99 to −55.72 (12.4F), −78.48 (2F), −80.66 (2F), −89.16 to −91.14 (24.8F)

Example 17

A compound (AQ) represented by Formula (AQ) (in Formula (AQ), maq indicating an average degree of polymerization is 6.2 and naq indicating an average degree of polymerization is 6.2) was obtained by the following method.

First, a compound obtained by reacting 4-hexyloxybenzoic acid and 2-aminoethanol was reacted with epibromohydrin to synthesize a compound represented by the following Formula (11-14).

(11-14)

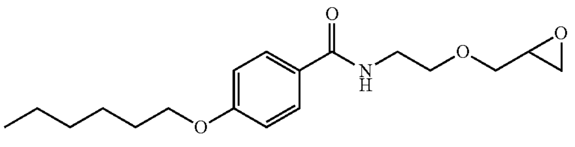

15.0 g of a compound (AQ) was obtained in the same operation as in Example 1 except that, instead of the compound (11-1) represented by Formula (11-1) used in Example 1, a compound (11-14) represented by Formula (11-14) (5.93 g) was used.

$^1$H-NMR and $^{19}$F-NMR measurement of the obtained compound (AQ) were performed, and the structure was identified from the following results.

$^1$H-NMR (acetone-$d_6$): δ [ppm]=0.94 (3H), 1.32-1.61 (8H), 3.40-4.00 (17H), 4.10-4.80 (10H), 7.20-8.00 (5H), 8.50 (1H)

$^{19}$F-NMR (acetone-$d_6$): δ [ppm]=−51.99 to 55.72 (12.4F), −78.48 (2F), −80.66 (2F), −89.16 to 91.14 (24.8F)

Example 18

A compound (AR) represented by formula (AR) (in Formula (AR), mar indicating an average degree of polymerization is 6.2 and nar indicating an average degree of polymerization is 6.2) was obtained by the following method.

First, a compound obtained by reacting terephthalamic acid and 2-aminoethanol was reacted with epibromohydrin to synthesize a compound represented by the following Formula (11-15).

(11-15)

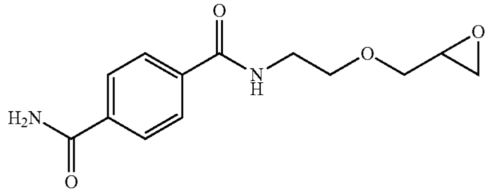

14.5 g of a compound (AR) was obtained in the same operation as in Example 1 except that, instead of the compound (11-1) represented by Formula (11-1) used in Example 1, a compound (11-15) represented by Formula (11-15) (4.88 g) was used.

$^1$H-NMR and $^{19}$F-NMR measurement of the obtained compound (AR) were performed, and the structure was identified from the following results.

$^1$H-NMR (acetone-$d_6$): δ [ppm]=3.40-4.00 (15H), 4.10-4.80 (10H), 6.50-6.70 (1H), 7.60-8.70 (5H), 8.50 (1H)

$^{19}$F-NMR (acetone-$d_6$): δ [ppm]=−51.99 to −55.72 (12.4F), −78.48 (2F), −80.66 (2F), −89.16 to −91.14 (24.8F)

Example 19

A compound (AS) represented by Formula (AS) (in Formula (AS), mas indicating an average degree of polymerization is 6.2 and nas indicating an average degree of polymerization is 6.2) was obtained by the following method.

First, a compound obtained by reacting 3-hydroxypropionic acid and aniline was reacted with epibromohydrin to synthesize a compound represented by the following Formula (11-16).

(11-16)

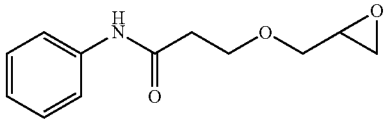

14.1 g of a compound (AS) was obtained in the same operation as in Example 1 except that, instead of the compound (11-1) represented by Formula (11-1) used in Example 1, a compound (11-16) represented by Formula (11-16) (4.08 g) was used.

$^1$H-NMR and $^{19}$F-NMR measurement of the obtained compound (AS) were performed, and the structure was identified from the following results.

$^1$H-NMR (acetone-$d_6$): δ [ppm]=2.72 (2H), 3.40-4.00 (13H), 4.10-4.80 (10H), 7.20-8.00 (5H), 8.50 (1H)

$^{19}$F-NMR (acetone-$d_6$): δ [ppm]=−51.99 to −55.72 (12.4F), −78.48 (2F), −80.66 (2F), −89.16 to −91.14 (24.8F)

Example 20

A compound (AT) represented by Formula (AT) (in Formula (AT), mat indicating an average degree of polymerization is 6.2 and nat indicating an average degree of polymerization is 6.2) was obtained by the following method.

First, 3-(benzyloxy) propanoic acid was reacted with aniline and was then reacted with methyl iodide in the presence of sodium hydride. The obtained compound was catalytically hydrogenated in the presence of palladium carbon and was then reacted with epibromohydrin to synthesize a compound represented by the following Formula (11-17).

(11-17)

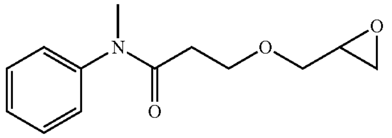

14.2 g of a compound (AT) was obtained in the same operation as in Example 1 except that, instead of the compound (11-1) represented by Formula (11-1) used in Example 1, a compound (11-17) represented by Formula (11-17) (4.34 g) was used.

$^1$H-NMR and $^{19}$F-NMR measurement of the obtained compound (AT) were performed, and the structure was identified from the following results.

$^1$H-NMR (acetone-$d_6$): δ [ppm]=2.72 (2H), 3.21 (3H), 3.40-4.00 (13H), 4.10-4.80 (10H), 7.20-8.00 (5H)

$^{19}$F-NMR (acetone-$d_6$): δ [ppm]=>51.99 to 55.72 (12.4F), −78.48 (2F), −80.66 (2F), −89.16 to 91.14 (24.8F)

Example 21

A compound (AU) represented by Formula (AU) (in Formula (AU), mau indicating an average degree of polymerization is 6.2 and nau indicating an average degree of polymerization is 6.2) was obtained by the following method.

First, 1,6-hexanediol was reacted with 1 equivalent of 3,4-dihydro-2H-pyran. The obtained compound was reacted with epibromohydrin to synthesize a compound represented by the following Formula (12-2).

(12-2)

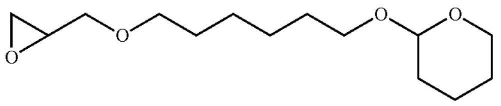

14.4 g of a compound (AU) was obtained in the same operation as in Example 1 except that, instead of the compound (12-1) represented by Formula (12-1) used in Example 1, a compound (12-2) represented by Formula (12-2) (3.50 g) was used.

$^{1}$H-NMR and $^{19}$F-NMR measurement of the obtained compound (AU) were performed, and the structure was identified from the following results.

$^{1}$H-NMR (acetone-$d_6$): δ [ppm]=1.20-1.80 (8H), 3.40-4.00 (11H), 4.10-4.80 (10H), 6.50-6.70 (1H), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 22

A compound (AV) represented by Formula (AV) (in Formula (AV), mav indicating an average degree of polymerization is 6.2 and nav indicating an average degree of polymerization is 6.2) was obtained by the following method.

First, a compound represented by the following Formula (12-4) was synthesized by the following method. A primary hydroxyl group of 3-allyloxy-1,2-propanediol was protected with a t-butyldimethylsilyl group, and a secondary hydroxyl group was then protected with a methoxymethyl group. When the t-butyldimethylsilyl group was removed from the obtained compound, a compound (12-3) represented by the following Formula (12-3) was synthesized. The obtained compound (12-3) and 2-(2-chloroethoxy)tetrahydropyran were reacted, and the double bond was then oxidized using meta-chloroperoxybenzoic acid to synthesize a compound (12-4) represented by the following Formula (12-4).

(12-3)

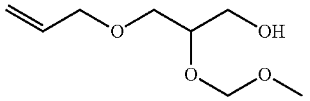

(12-4)

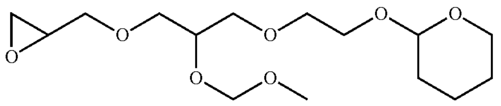

14.5 g of a compound (AV) was obtained in the same operation as in Example 1 except that, instead of the compound (12-1) represented by Formula (12-1) used in Example 1, a compound (12-4) represented by Formula (12-4) (4.34 g) was used.

$^{1}$H-NMR and $^{19}$F-NMR measurement of the obtained compound (AV) were performed, and the structure was identified from the following results.

$^{1}$H-NMR (acetone-$d_6$): δ [ppm]=3.40-4.00 (14H), 4.10-4.80 (13H), 6.50-6.70 (1H), 7.00-8.10 (5H)

$^{19}$F-NMR (acetone-$d_6$): δ [ppm]=51.99 to 55.72 (12.4F), −78.48 (2F), −80.66 (2F), −89.16 to 91.14 (24.8F)

Example 23

A compound (AW) represented by Formula (AW) (in Formula (AW), maw indicating an average degree of polymerization is 6.2 and naw indicating an average degree of polymerization is 6.2) was obtained by the following method.

First, 2-hydroxybenzamide and allyl glycidyl ether were reacted, and the double bond was then oxidized using meta-chloroperoxybenzoic acid to synthesize a compound represented by the following Formula (11-18).

(11-18)

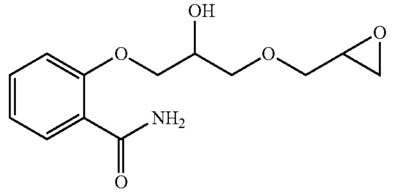

14.5 g of a compound (AW) was obtained in the same operation as in Example 1 except that, instead of the compound (11-1) represented by Formula (11-1) used in Example 1, a compound (1.1-18) represented by Formula (11-18) (4.93 g) was used.

$^{1}$H-NMR and $^{19}$F-NMR measurement of the obtained compound (AW) were performed, and the structure was identified from the following results.

$^{1}$H-NMR (acetone-$d_6$): δ [ppm]=3.40-4.00 (14H), 4.10-4.80 (13H), 6.50-6.70 (1H), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 24

A compound (AX) represented by Formula (AX) (in Formula (AX), max indicating an average degree of polymerization is 6.2 and nax indicating an average degree of polymerization is 6.2) was obtained by the following method.

First, 3-buten-1-ol and 3,4-dihydro-2H-pyran were reacted to protect the hydroxyl group of 3-buten-1-ol with a tetrahydropyranyl group, and the double bond was then oxidized with meta-chloroperoxybenzoic acid to synthesize a compound represented by the following Formula (12-5).

(12-5)

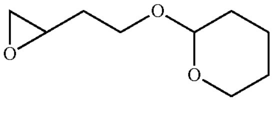

14.3 g of a compound (AX) was obtained in the same operation as in Example 23 except that, instead of the compound (12-1) represented by Formula (12-1) used in Example 23, a compound (12-5) represented by Formula (12-5) (2.33 g) was used.

$^{1}$H-NMR and $^{19}$F-NMR measurement of the obtained compound (AX) were performed, and the structure was identified from the following results.

$^1$H-NMR (acetone-$d_6$): δ [ppm]=1.40 (2H), 3.40-4.00 (12H), 4.10-4.80 (11H), 6.50-6.70 (1H), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 25

A compound (AY) represented by Formula (AY) (in Formula (AY), may indicating an average degree of polymerization is 6.2 and nay indicating an average degree of polymerization is 6.2) was obtained by the following method.

First, a compound represented by the following Formula (12-7) was synthesized by the following method. 6-hepten-1-ol and 3,4-dihydro-2H-pyran were reacted to protect the hydroxyl group of 6-hepten-1-ol with a tetrahydropyranyl group, and the double bond was then oxidized with meta-chloroperoxybenzoic acid to synthesize compound represented by the following Formula (12-6). The obtained compound (12-6) was reacted with allyl alcohol, and was then reacted with 3,4-dihydro-2H-pyran, so that the secondary hydroxyl group was protected with a tetrahydropyranyl group. Finally, the double bond was oxidized with meta-chloroperoxybenzoic acid to synthesize a compound (12-7) represented by the following Formula (12-7).

(12-6)

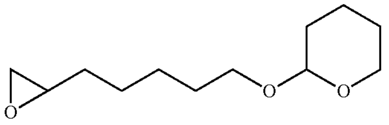

(12-7)

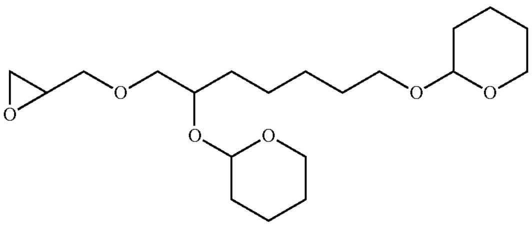

14.6 g of a compound (AY) was obtained in the same operation as in Example 1 except that, instead of the compound (12-1) represented by Formula (12-1) used in Example 1, a compound (12-7) represented by Formula (12-7) (5.04 g) was used.

$^1$H-NMR and $^{19}$F-NMR measurement of the obtained compound (AY) were performed, and the structure was identified from the following results.

$^1$H-NMR (acetone-$d_6$): δ [ppm]=1.20-1.80 (8H), 3.40-4.00 (12H), 4.10-4.80 (11H), 6.50-6.70 (1H), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 26

A compound (AZ) represented by Formula (AZ) (in Formula (AZ), maz indicating an average degree of polymerization is 6.2 and naz indicating an average degree of polymerization is 6.2) was obtained by the following method.

First, a compound represented by the following Formula (12-8) was synthesized by the following method. The compound (12-1) represented by Formula (12-1) way reacted with 3-buten-1-ol and was then reacted with 3,4-dihydro-2H-pyran, so that the secondary hydroxyl group was protected with a tetrahydropyranyl group. Finally, the double bond was oxidized with meta-chloroperoxybenzoic acid to synthesize a compound (12-8) represented by the following Formula (12-8).

(12-8)

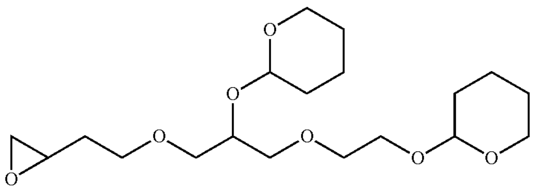

14.6 g of a compound (AZ) was obtained in the same operation as in Example 1 except that, instead of the compound (12-1) represented by Formula (12-1) used in Example 1, a compound (12-8) represented by Formula (12-8) (5.07 g) was used.

$^1$H-NMR and $^{19}$F-NMR measurement of the obtained compound (AZ) were performed, and the structure was identified from the following results.

$^1$H-NMR (acetone-$d_6$); δ [ppm]=1.40 (2H), 3.40-4.00 (14H), 4.10-4.80 (13H), 6.50-6.70 (1H), 7.00-8.10 (5H)

$^{19}$F-NMR (acetone-$d_6$): δ [ppm]=−51.99 to −55.72 (12.4F), −78.48 (2F), −80.66 (2F), −89.16 to −91.14 (24.8F)

Example 27

A compound (BA) represented by Formula (BA) (in Formula (BA), nba indicating an average degree of polymerization is 6.2) was obtained by the following method.

First, 4'-hydroxyacetanilide and allyl glycidyl ether were reacted, and the double bond was then oxidized with meta-chloroperoxybenzoic acid to synthesize a compound represented by the following Formula (11-19).

(11-19)

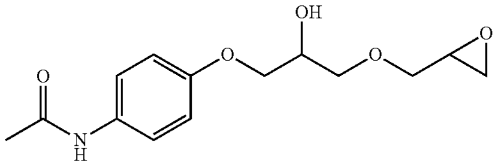

15:4 g of a compound (BA) was obtained in the same operation as in Example 11 except that, instead of the fluoropolyether (a number-average molecular weight of 1,300 and a molecular weight distribution of 1.1) represented by $HOCH_2CF_2O(CF_2CF_2O)_u(CF_2O)_vCF_2CH_2OH$ (in the formula, u indicating an average degree of polymerization is 6.2 and v indicating an average degree of polymerization is 6.2) in Example 11, a fluoropolyether (a number-average molecular weight of 1,300 and a molecular weight distribution of 1.1) represented by $HOCH_2CF_2CF_2O(CF_2CF_2CF_2O)_xCF_2CF_2CH_2OH$ (in the formula, x indicating an average degree of polymerization is 6.2) (40.0 g) was used, and instead of the compound (12-1) represented by Formula (12-1) in Example 11, a compound (11-19) represented by Formula (11-19) (3.81 g) was used.

$^1H$-NMR and $^{19}F$-NMR measurement of the obtained compound (BA) were performed, and the structure was identified from the following results.

$^1H$-NMR (acetone-$d_6$): δ [ppm)]=2.09 (6H), 3.40-4.00 (12H), 4.10-4.80 (11H), 6.50-7.50 (8H), 9.00 (2H)

$^{19}F$-NMR (acetone-$d_6$): δ [ppm]=−84.22 (24.8F), −86.40 (4F), −124.30 (4F), −130.08 (12.4F)

Example 28

A compound (BB) represented by Formula (BB) (in Formula (BB), nbb indicating an average degree of polymerization is 6.2) was obtained by the following method.

A fluoropolyether (a number-average molecular weight of 1,300 and a molecular weight distribution of 1.1) represented by $HOCH_2CF_2CF_2O(CF_2CF_2CF_2O)_xCF_2CF_2CH_2OH$ (in the formula, x indicating an average degree of polymerization is 6.2) (40.0 g), a compound represented by Formula (11-19) (17.3 g), and t-BuOH (tert-butyl alcohol) (40.0 mL) were put into a 200 mL eggplant flask under a nitrogen gas atmosphere and were stirred until the mixture became uniform at room temperature. In addition, t-BuOK (potassium tert-butoxide) (1.04 g) was put into the eggplant flask, and the mixture was heated to 70° C., stirred for 12 hours to perform the reaction.

Then, the obtained reaction product was cooled to 25° C., water was added, ethyl acetate was additionally added as a solvent, the organic layer thereof was extracted, and washing with water was performed. Anhydrous sodium sulfate was added to the organic layer for dehydration, the drying agent was removed by filtration, and the filtrate was then concentrated. The residue was purified by silica gel column chromatography, and thereby 34.4 g of a compound (BB) was obtained.

$^1H$-NMR and $^{19}F$-NMR measurement of the obtained compound (BB) were performed, and the structure was identified from the following results.

$^1H$-NMR (acetone-$d_6$): δ [ppm]=2.09 (6H), 3.40-4.00 (15H), 4.10-4.80 (14H), 6.50-7.50 (8H), 9.00 (2H)

$^{19}F$-NMR (acetone-$d_6$): δ [ppm]=−84.22 (24.8F), −86.40 (4F), −124.30 (4F), −130.08 (12.4F)

Table 1 and Table 2 show $R^1$ (end group represented by $R^1$, structure, aromatic hydrocarbon), [B]-[A] (c in Formula (3-1), d and e in Formula (3-2)), the structure of $R^2$. [C]-[D] (f in Formula (4-1) and g and h in Formula (4-2)), and $R^3$ (a, b, and $X^1$ in Formula (2)), when the compounds (AA) to (BB) of Examples 1 to 28 obtained in this manner were applied to Formula (1).

TABLE 1

| | $R^1$ | | | [B]-[A] | | | | [C]-[D] | | | $R^3$ | | |
|---|---|---|---|---|---|---|---|---|---|---|---|---|---|
| Compound | $R^1$ | Structure | Aromatic hydrocarbon | c | d | e | $R^2$ | f | g | h | a | b | $X^1$ |
| (AA) | (10-1) ortho position | (5-1) | benzene ring | 1 | — | — | (8-2) | 1 | — | — | 2 | 1 | hydrogen atom |
| (AB) | (10-1) ortho position | (5-1) | benzene ring | 1 | — | — | (8-2) | 1 | — | — | 2 | 1 | hydrogen atom |
| (AC) | (10-1) ortho position | (5-1) | benzene ring | 1 | — | — | (8-4) | 1 | — | — | 2 | 1 | hydrogen atom |
| (AD) | (10-1) ortho position | (5-1) | benzene ring | 1 | — | — | (8-5) | 1 | — | — | 2 | 1 | hydrogen atom |
| (AE) | (10-1) meta position | (5-1) | benzene ring | 1 | — | — | (8-2) | 1 | — | — | 2 | 1 | hydrogen atom |
| (AF) | (10-1) para position | (5-1) | benzone ring | 1 | — | — | (8-2) | 1 | — | — | 2 | 1 | hydrogen atom |
| (AG) | (10-11) | (5-3) | naphthalone ring | 1 | — | — | (8-2) | 1 | — | — | 2 | 1 | hydrogen atom |
| (AH) | (10-27) para position | (5-1) | benzene ring | 1 | — | — | (8-2) | 1 | — | — | 2 | 1 | hydrogen atom |
| (AI) | (10-28) para position | (5-1) | benzene ring | 1 | — | — | (8-2) | 1 | — | — | 2 | 1 | hydrogen |
| (AJ) | (10-8) para position | (5-1) | benzene ring | 1 | — | — | (8-2) | 1 | — | — | 2 | 1 | hydrogen atom |
| (AK) | (10-12) para position | (5-1) | benzene ring | 1 | — | — | (8-2) | 1 | — | — | 2 | 1 | hydrogen atom |
| (AL) | (10-29) para position | (5-1) | benzene ring | 1 | — | — | (8-2) | 1 | — | — | 2 | 1 | hydrogen atom |
| (AM) | (10-30) para position | (5-1) | benzene ring | 1 | — | — | (8-2) | 1 | — | — | 2 | 1 | hydrogen atom |

TABLE 2

| | $R^1$ | | | [B]-[A] | | | | [C]-[D] | | | $R^3$ | | |
|---|---|---|---|---|---|---|---|---|---|---|---|---|---|
| Compound | $R^1$ | Structure | Aromatic hydrocarbon | c | d | e | $R^2$ | f | g | h | a | b | $X^1$ |
| (AN) | (10-18) | (5-4) | benzene ring | 1 | — | — | (8-2) | 1 | — | — | 2 | 1 | hydrogen atom |
| (AO) | (10-31) | (5-4) | benzene ring | 1 | — | — | (8-2) | 1 | — | — | 2 | 1 | hydrogen atom |
| (AP) | (10-32) | (5-4) | benzene ring | 1 | — | — | (8-2) | 1 | — | — | 2 | 1 | hydrogen aton |
| (AQ) | (10-33) | (5-4) | benzene ring | 1 | — | — | (8-2) | 1 | — | — | 2 | 1 | hydrogen atom |
| (AR) | (10-34) | (5-4) | benzene ring | 1 | — | — | (8-2) | 1 | — | — | 2 | 1 | hydrogen atom |
| (AS) | (10-21) | (5-5) | benzene ring | 1 | — | — | (8-2) | 1 | — | — | 2 | 1 | hydrogen atom |
| (AT) | (10-23) | (5-5) | benzene ring | 1 | — | — | (8-2) | 1 | — | — | 2 | 1 | hydrogen atom |
| (AU) | (10-1) ortho position | (5-1) | benzene ring | 1 | — | — | (8-2) | 1 | — | — | 6 | 1 | hydrogen atom |
| (AV) | (10-1) ortho position | (5-1) | benzene ring | 1 | — | — | (8-2) | 2 | — | — | 2 | 1 | hydrogen atom |
| (AW) | (10-1) ortho position | (5-1) | benzene ring | 2 | — | — | (8-2) | 1 | — | — | 2 | 1 | hydrogen atom |
| (AX) | (10-1) ortho position | (5-1) | benzene ring | 2 | — | — | (8-2) | — | 1 | 2 | — | 0 | hydrogen atom |
| (AY) | (10-1) ortho position | (5-1) | benzene ring | 1 | — | — | (8-2) | 1 | 1 | 5 | — | 0 | hydrogen atom |
| (AZ) | (10-1) ortho position | (5-1) | benzene ring | 1 | — | — | (8-2) | 1 | 1 | 2 | 2 | 1 | hydrogen atom |
| (BA) | (10-12) para position | (5-1) | benzene ring | 1 | — | — | (8-4) | 2 | — | — | — | 0 | same as $R^1$ |
| (BB) | (10-12) para position | (5-1) | benzene ring | 2 | — | — | (8-4) | 2 | — | — | — | 0 | same as $R^1$ |

Comparative Example 1

A compound (ZA) represented by the following Formula (ZA) was synthesized by the method described in Patent Document 1.

(ZA)

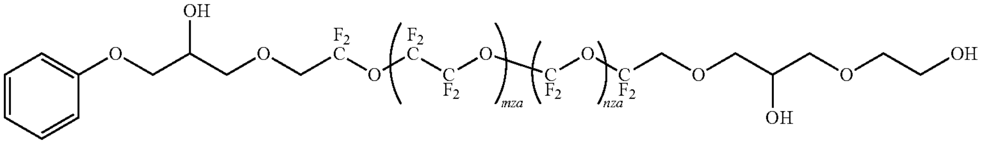

(in Formula (ZA), mza indicating an average degree of polymerization is 6.2 and nza indicating an average degree of polymerization is 6.2)

Comparative Example 2

A compound (ZB) represented by the following Formula (ZB) was synthesized by the method described in Patent Document 2.

(ZB)

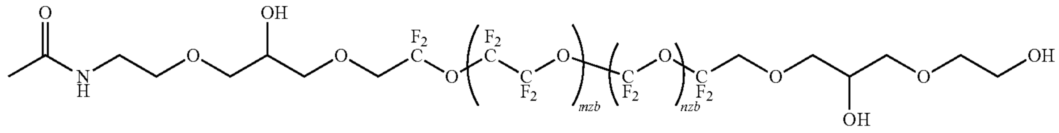

(in Formula (ZB), mzb indicating an average degree of polymerization is 6.2 and nzb indicating an average degree of polymerization is 6.2)

Comparative Example 3

A compound (ZC) represented by the following Formula (ZC) was synthesized by the method described in Patent Document 3. That is, in Example 1 in Patent Document 3, synthesis was performed using a compound represented by Formula (11-8) instead of glycidyl phenyl ether.

(ZC)

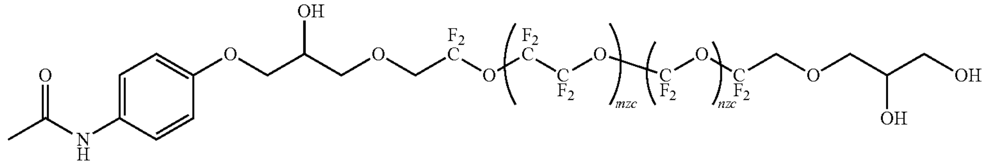

(in Formula (ZC), mze indicating an average degree of polymerization is 6.2 and nze indicating an average degree of polymerization is 6.2)

Comparative Example 4

A compound (ZD) represented by the following Formula (ZD) was synthesized by the method described in Patent Document 4.

(ZD)

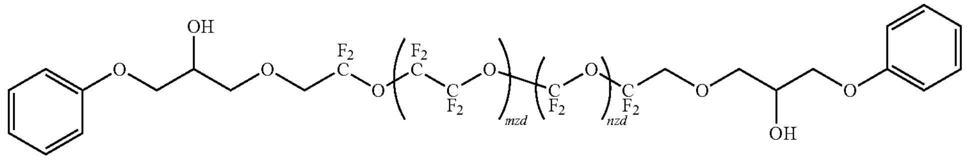

(in Formula (ZD), mid indicating an average degree of polymerization is 6.2 and nzd indicating an average degree of polymerization is 6.2)

Comparative Example 5

A compound (ZE) represented by the following Formula (ZE) was synthesized by the method described in Patent Document 5. That is, in Example 1 of Patent Document 5, synthesis was performed using a compound represented by Formula (11-8) instead of 4-methoxyglycidyl phenyl ether.

(ZE)

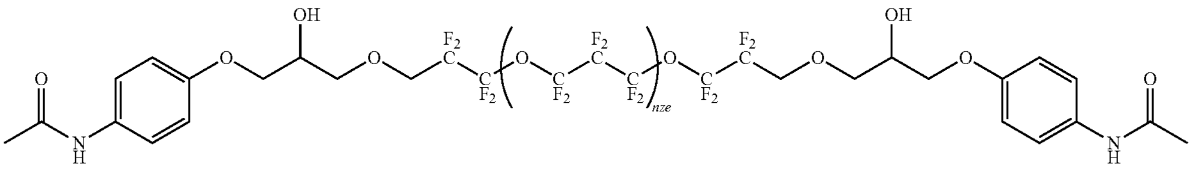

(in Formula (ZE), nze indicating an average degree of polymerization is 6.2)

Comparative Example 6

A compound (ZF) represented by the following Formula (ZF) was synthesized by the method described in Patent Document 2.

(ZF)

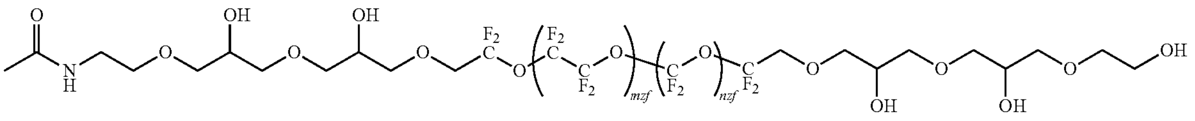

(in Formula (ZF), nit indicating an average degree of polymerization is 6.2 and nzf indicating an average degree of polymerization is 6.2)

Comparative Example 7

A compound (ZG) represented by the following Formula (ZG) was synthesized by the method described in Patent Document 2.

(ZG)

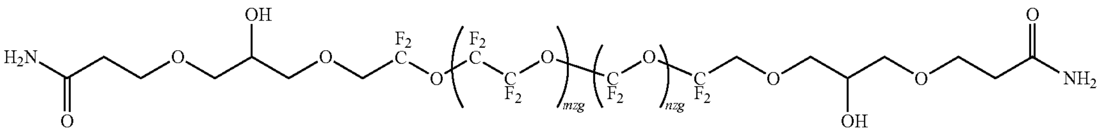

(in Formula (20), mzg indicating an average degree of polymerization is 6.2 and nzg indicating an average degree of polymerization is 6.2)

Comparative Example 8

A compound (ZH) represented by the following Formula (ZH) was synthesized by the method described in Patent Document 2.

(ZH)

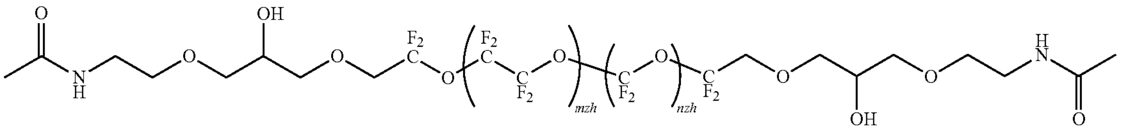

(in Formula (ZH), mzh indicating an average degree of polymerization is 6.2 and nzh indicating an average degree of polarization is 6.2)

Table 3 shows the number-average molecular weight (Mn) (the number-average) molecular weight of the PFPE chain, and the number-average molecular weight of the entire molecule), and PFPE ratio (PFPE chain Mn/entire molecule Mn) of the compounds (AA) to (BB), and (ZA) to (ZH) obtained in Examples 1 to 28 and Comparative Examples 1 to 8.

TABLE 3

| | | Number-average molecular weight Mn | | PFPE ratio PFPE chain Mn/Entire | Film | | | | Smooth- | Com- |
|---|---|---|---|---|---|---|---|---|---|---|
| | Compound | PFPE chain | Entire molecule | molecule Mn | thickness (Å) | Bond rate | Pickup characteristics | Spin-off characteristics | ness (TDp) | prehensive evaluation |
| Example 1 | (AA) | 1238 | 1611 | 0.77 | 10.0 | A | A | A | A | A |
| Example 2 | (AB) | 1238 | 1611 | 0.77 | 10.0 | A | A | A | A | A |
| Example 3 | (AC) | 1238 | 1611 | 0.77 | 10.0 | A | A | A | A | A |
| Example 4 | (AD) | 1238 | 1611 | 0.77 | 10.0 | A | A | A | A | A |
| Example 5 | (AE) | 1238 | 1611 | 0.77 | 10.0 | A | A | A | A | A |
| Example 6 | (AF) | 1238 | 1611 | 0.77 | 10.0 | A | A | A | A | A |
| Example 7 | (AG) | I238 | 1661 | 0.75 | 10.0 | A | A | A | A | A |
| Example 8 | (AH) | 1238 | 1710 | 0.72 | 10.0 | A | A | A | A | A |
| Example 9 | (AJ) | 1238 | 1695 | 0.73 | 10.0 | B | B | A | B | B |
| Example 10 | (AJ) | 1238 | 1679 | 0.74 | 10.0 | B | B | A | B | B |
| Example 11 | (AK) | 1238 | 1625 | 0.76 | 10.0 | A | A | A | A | A |
| Example 12 | (AL) | 1238 | 1710 | 0.72 | 10.0 | A | A | A | A | A |
| Example 13 | (AM) | 1238 | 1710 | 0.72 | 10.0 | B | B | A | B | B |
| Example 14 | (AN) | 1238 | 1639 | 0.76 | 10.0 | A | A | A | A | A |
| Example 15 | (AO) | 1238 | 1695 | 0.73 | 10.0 | A | A | A | A | A |
| Example 16 | (AP) | 1238 | 1724 | 0.72 | 10.0 | A | A | A | A | A |
| Example 17 | (AQ) | 1238 | 1740 | 0.71 | 10.0 | A | A | A | A | A |
| Example 18 | (AR) | 1238 | 1682 | 0.74 | 10.0 | A | A | A | A | A |
| Example 19 | (AS) | 1238 | 1639 | 0.76 | 10.0 | A | A | A | A | A |
| Example 20 | (AT) | 1238 | 1653 | 0.75 | 10.0 | B | B | B | B | B |
| Example 21 | (AU) | 1238 | 1667 | 0.74 | 10.0 | A | A | A | A | A |
| Example 22 | (AV) | 1238 | 1685 | 0.73 | 10.0 | A | A | A | A | A |
| Example 23 | (AW) | 1238 | 1685 | 0.73 | 10.0 | A | A | A | A | A |
| Example 24 | (AX) | 1238 | 1655 | 0.75 | 10.0 | A | A | A | A | A |
| Example 25 | (AY) | 1238 | 1697 | 0.73 | 10.0 | A | A | A | A | A |
| Example 26 | (AZ) | 1238 | 1699 | 0.73 | 10.0 | A | A | A | A | A |
| Example 27 | (BA) | 1238 | 1789 | 0.69 | 10.0 | A | A | A | A | A |
| Example 28 | (BB) | 1238 | 1863 | 0.66 | 10.0 | A | A | A | A | A |
| Comparative Example 1 | (ZA) | 1238 | 1568 | 0.79 | 10.0 | C | C | D | D | D |
| Comparative Example 2 | (ZB) | 1238 | 1577 | 0.78 | 10.0 | C | C | D | D | D |
| Comparative Example 3 | (ZC) | 1238 | 1581 | 0.78 | 10.0 | D | D | D | D | D |
| Comparative Example 4 | (ZD) | 1238 | 1600 | 0.77 | 10.0 | D | D | D | D | D |
| Comparative Example 5 | (ZE) | 1238 | 1714 | 0.72 | 10.0 | C | D | C | D | D |

TABLE 3-continued

| | Compound | Number-average molecular weight Mn PFPE chain | Entire molecule | PFPE ratio PFPE chain Mn/Entire molecule Mn | Film thickness (Å) | Bond rate | Pickup characteristics | Spin-off characteristics | Smoothness (TDp) | Comprehensive evaluation |
|---|---|---|---|---|---|---|---|---|---|---|
| Comparative Example 6 | (ZF) | 1238 | 1766 | 0.70 | 10.0 | C | C | C | D | D |
| Comparative Example 7 | (ZG) | 1238 | 1590 | 0.78 | 10.0 | D | D | D | D | D |
| Comparative Example 8 | (ZH) | 1238 | 1618 | 0.77 | 10.0 | D | D | D | D | D |

Next, lubricating layer forming solutions were prepared using the compounds obtained in Examples 1 to 28 and Comparative Examples 1 to 8 by the following method. Then, lubricating layers of magnetic recording media were formed using the obtained lubricating layer forming solutions by the following method to obtain magnetic recording media of Examples 1 to 28 and Comparative Examples 1 to 8.

[Lubricating Layer Forming Solution]

The compounds obtained in Examples 1 to 28 and Comparative Examples 1 to 8 were dissolved in Vertrel (registered trademark) XF (product name, commercially available from Du Pont-Mitsui Fluorochemicals Co., Ltd.) as a fluorine-based solvent and were diluted with Vertrel XF such that the film thickness was 8.5 Å to 10 Å when applied onto the protective layer, and were used as a lubricating layer forming solution in which the concentration of the compound was 0.001 mass % to 0.01 mass %.

[Magnetic Recording Medium]

An adhesive layer, a soft magnetic layer, a first underlayer, a second underlayer, a magnetic layer, and a protective layer were sequentially provided on a substrate with a diameter of 65 mm. The protective layer was made of nitrogenated carbon.

The lubricating layer forming solutions of Examples 1 to 28 and Comparative Examples 1 to 8 were applied onto the protective layer of the substrate in which respective layers up to the protective layer were formed by a dipping method.

Then, the magnetic recording medium to which the lubricating layer forming solution was applied was put into a thermostatic chamber at 120° C., and was subjected to a thermal treatment for heating for 10 minutes. Accordingly, the lubricating layer was formed on the protective layer to obtain magnetic recording media of Examples 1 to 28 and Comparative Examples 1 to 8.

For the magnetic recording media of Examples 1 to 28 and Comparative Examples 1 to 8 obtained in this manner, by the following methods, measurement of the film thickness of the lubricating layer, measurement of the adhesion (bond rate) between the lubricating layer and the protective layer, the pickup characteristic test, the spin-off characteristic test, and the smoothness (touchdown power) test were performed and evaluated. The results are shown in Table 3.

[Measurement of Film Thickness of Lubricating Layer]

Using a Fourier transform infrared spectrophotometer (FT-IR, product name: Nicolet iS50, commercially available from Thermo Fisher Scientific), the peak height of the C-F stretching vibration of the lubricating layer was measured. Next, using the correlation formula obtained by the following method, the film thickness of the lubricating layer was calculated from the measured value of the peak height of the C-F stretching vibration of the lubricating layer.

[Method of Calculating Correlation Formula]

Disks in which an adhesive layer, a soft magnetic layer, a first underlayer, a second underlayer, a magnetic layer, and a protective layer were sequentially provided on a substrate having a diameter of 65 mm were prepared. A lubricating layer was respectively formed on the protective layer of the disk with a film thickness of 6 Å to 20 Å (changed by 2 Å).

Then, for each disk on which the lubricating layer was formed, the film thickness increment from the surface of the disk on which no lubricating layer was formed was measured using an ellipsometer, and was used as the film thickness of the lubricating layer. In addition, for each disk on which the lubricating layer was formed, the peak height of the C-F stretching vibration was measured using FT-IR.

Then, a correlation formula between the peak height obtained by FT-IR and the film thickness of the lubricating layer obtained using an ellipsometer was obtained.

[Measurement of Adhesion (Bond Rate) Between Lubricating Layer and Protective Layer]

After the film thickness of the lubricating layer was measured by the above method, the magnetic recording medium in which the lubricating layer was formed was washed by a method of immersing in a solvent Vertrel XF for 10 minutes and then lifting. The speed at which the magnetic recording medium was immersed in a solvent was 10 mm/see, and the lifting speed was 1.2 mm/sec. Then, the film thickness of the lubricating layer after immersion in the solvent (after washing) was measured by the same method which was performed for measuring the film thickness of the lubricating layer before washing.

Then, the film thickness of the lubricating layer before washing was set as $\alpha$, the film thickness of the lubricating layer after washing (after immersion in the solvent) was set as $\beta$, and the bonding rate (bond rate) of the lubricant was calculated based on the ratio of $\alpha$ and $\beta$ $((\beta/\alpha)\times 100\ (5\%))$. Using the calculated bond rate, based on the following criteria, the adhesion between the lubricating layer and the protective layer was evaluated.

The bond rate could be used as an index indicating the bonding force between the lubricating layer and the protective layer. When the adhesion between the lubricating layer and the protective layer is poor, a part of the fluorine-containing ether compound contained in the lubricating layer is eluted into Vertrel XF and is washed away. Therefore, the film thickness of the lubricating layer after washing decreases, and the bond rate decreases.

"Evaluation Criteria for Adhesion (Bond Rate)"

A (excellent): bond rate of 65% or more

B (good): bond rate of 60% to 64%

C (acceptable): bond rate of 40% to 59%

D (poor): bond rate of 39% or less

[Pickup Characteristic Test]

A magnetic recording medium and a magnetic head were mounted on a spin stand, rotation was performed under a reduced pressure at room temperature (about 250 torr), and the magnetic head was floated at a fixed point for 10 minutes. Then, the surface of the magnetic head facing the magnetic recording medium was analyzed using an electron spectroscopy for chemical analysis (ESCA) analysis device. The intensity (signal intensity (a.u.) of the fluorine-derived peak obtained by analysis using the ESCA analysis device indicated the amount of the lubricant adhered to the magnetic bead. Using the signal intensity of the obtained fluorine-derived peak, based on the following evaluation criteria, pickup characteristics were evaluated.

"Evaluation Criteria for Pickup Characteristics"

A (excellent): signal intensity of 160 or less (very small adhesion amount)

B (good): signal intensity of 161 to 300 (small adhesion amount)

C (acceptable): signal intensity of 301 to 1,000 (large adhesion amount)

D (poor): signal intensity of 1,001 or more (very large adhesion amount)

[Spin-Off Characteristic Test]

A magnetic recording medium was mounted on a spin stand and was rotated for 72 hours at a rotational speed of 10,000 rpm under an environment at 80° C. Before and after this operation, the film thickness of the lubricating layer at a position with a radius of 20 mm from the center of the magnetic recording medium was measured using FT-IR, and the film thickness reduction rate of the lubricating layer before and after the test was calculated. Using the calculated film thickness reduction rate, spin-off characteristics were evaluated based on the following evaluation criteria.

"Evaluation Criteria for Spin-Off Characteristics"

A (excellent): film thickness reduction rate of 2% or less

B (good): film thickness reduction rate of more than 2% and 3% or less

C (acceptable): film thickness reduction rate of more than 3% and 9% or less

D (poor): film thickness reduction rate of more than 9%

[Smoothness (Touchdown Power) Test of Lubricating Layer]

As an evaluation index of the smoothness of the surface of the lubricating layer, a touchdown power (TDp) was measured. Measurement of TDp was performed using a writing tester (DFH tester) as follows.

A magnetic recording medium to be evaluated was rotated at 5,400 rpm, and the magnetic head was arranged to face a position of the medium with a radios of 18 mm from the center. The heater power of a write element (DFH element) of the magnetic head was gradually increased, and the DPH element was thermally expanded by heat generated from the heater. Then, the heater power when the tip of the DFH element, which protruded due to thermal expansion of the DFH element, came into contact with the lubricating layer of the magnetic recording medium was measured as TDp (unit mW). Contact between the tip of the DFH element and the lubricating layer of the magnetic recording medium was detected by an acoustic emission (AE) sensor, Generally, when the film thickness of the lubricating layer is thinner, the TDp required for the DFH element to come into contact with the surface of the lubricating layer is higher. On the other hand, when comparing magnetic recording media having the same average film thickness, it is known that, the larger the surface unevenness of the lubricating layer is, the larger the maximum height of the lubricating layer is, and thus, the smaller the TDp value is.

"Smoothness Evaluation Criteria"

A (excellent): TDp value of 51.5 mW or more (very small surface unevenness)

B (good): TDp value of 51.0 to 51.4 mW (small surface unevenness)

C (acceptable): TDp value of 50.5 to 50.9 mW (large surface unevenness)

D (poor): TDp value of 50.4 mW or less (very large surface unevenness)

[Comprehensive Evaluation]

From the results of the measurement of the adhesion (bond rate) between the lubricating layer and the protective layer, the pickup characteristic test, the spin-off characteristic test, and the smoothness (touchdown power) test, comprehensive evaluation was performed based on the following evaluation criteria.

"Evaluation Criteria for Comprehensive Evaluation"

A (excellent): The bond rate, the pickup characteristics, the spin-off characteristics, and the smoothness were all evaluated as A (excellent).

B (good): The bond rate, the pickup characteristics, the spin-off characteristics, and the smoothness were evaluated as A (excellent) or B (good), and one or more thereof was B (good).

C (acceptable): One or more of the bond rate, the pickup characteristics, the spin-off characteristics, and the smoothness were evaluated as C. (acceptable), and there was no D (poor).

D (poor): One or more of the bond rate, the pickup characteristics, the spin-off characteristics, and the smoothness were evaluated as D (poor).

As shown in Table 3, in the magnetic recording media of Examples 1 to 28 in which the lubricating layer was formed using the fluorine-containing ether compound represented by Formula (1), the bond rate, the pickup characteristics, the spin-off characteristics, and the smoothness were all evaluated as A (excellent) or B (good), and the comprehensive evaluation was A (excellent) or B (good). That is, the magnetic recording media of Examples 1 to 28 had a lubricating layer in which pickup and spin-off were less likely to occur and which had favorable smoothness and adhesion with respect to the protective layer.

On the other hand, in the magnetic recording media of Comparative Examples 1 to 8, all of the bond rate, the pickup characteristics, the spin-off characteristics, and the smoothness evaluated were inferior to the results to those of the magnetic recording media of Examples 1 to 28.

More specifically, from the result of Comparative Example 1 using a compound having no amide bond, the result of Comparative Example 2 using a compound having no aromatic hydrocarbon, and the results of Examples 1, 5, 6, and 8 to 14 using a compound in which $R^1$ in Formula (1) contained a group in which a carbonyl carbon atom or nitrogen atom in an amide bond and an aromatic hydrocarbon were directly bonded, it was clearly understood that, when $R^1$ in Formula (1) contained a group in which a carbonyl carbon atom or nitrogen atom in an amide bond and an aromatic hydrocarbon were directly bonded, the bond rate, the pickup characteristics, the spin-off characteristics, and the smoothness were evaluated as favorable.

Accordingly, it was presumed that, in order to obtain a magnetic recording medium with a comprehensive evaluation of A (excellent) or B (good), as a material for the lubricating layer, it was necessary to use the fluorine-containing ether compound represented by Formula (1) in which a carbonyl carbon atom or nitrogen atom in an amide bond and an aromatic hydrocarbon of $R^1$ were directly bonded to form the same plane.

In addition, in both Comparative Example 3 and Example 11, a compound having an end group including a group in which a carbonyl carbon atom or nitrogen atom in an amide bond and an aromatic hydrocarbon were directly bonded was used. However, as shown in Table 3, Comparative Example 3 and Example 11 showed large differences in the bond rate, pickup characteristics, spin-off characteristics, and smoothness evaluation results. This was presumed to be because, since a compound having a vicinal diol structure was used in the magnetic recording medium of Comparative Example 3, there were hydroxyl groups in the lubricating layer that were not involved in adsorption with the protective layer.

In the magnetic recording media of Comparative Example 4, and Comparative Example 6 to Comparative Example 8, a compound having an end group including a group in which a carbonyl carbon atom or nitrogen atom in an amide bond and an aromatic hydrocarbon were directly bonded was not used. Therefore, as shown in Table 3, it was presumed that evaluation results of the bond rate, the pickup characteristics, the spin-off characteristics, and the smoothness were inferior to those of the magnetic recording media of Examples 1 to 28.

In the magnetic recording medium of Comparative Example 5, a compound in which the number of hydroxyl groups contained in the molecule was less than 3 was used. Therefore, it was presumed that the adsorption force of the hydroxyl group in the fluorine-containing ether compound with respect to the protective layer was insufficient, and the evaluation results of the bond rate, the pickup characteristics, the spin-off characteristics, and the smoothness were inferior to those of the magnetic recording media of Examples 1 to 28.

INDUSTRIAL APPLICABILITY

When the lubricant for a magnetic recording medium containing the fluorine-containing ether compound of the present invention is used, it is possible to form a lubricating layer in which pickup and spin-off are less likely to occur and which has favorable smoothness and adhesion with respect to the protective layer.

REFERENCE SIGNS LIST

10 Magnetic recording medium
11 Substrate
12 Adhesive layer
13 Soft magnetic layer
14 First underlayer
15 Second underlayer
16 Magnetic layer
17 Protective layer
18 Lubricating layer

The invention claimed is:

1. A fluorine-containing ether compound represented by Formula (1) shown below:

$R^1$-[B][A]-O—$CH_2$—$R^2$—$CH_2$—O-[C][D]-$R^3$ (1)

(in Formula (1), $R^1$ is an organic group having 7 to 18 carbon atoms, including a group in which a carbonyl carbon atom or nitrogen atom in an amide bond and an aromatic hydrocarbon are directly bonded; $R^2$ is a perfluoropolyether chain; $R^3$ is represented by the following Formula (2) shown below; in Formula (2), a represents an integer of 2 to 6, and b represents 0 or 1; $X^1$ is a hydrogen atom or an organic group having 7 to 18 carbon atoms, including a group in which a carbonyl carbon atom or nitrogen atom in an amide bond and an aromatic hydrocarbon are directly bonded; in Formula (1), [A] is represented by the following Formula (3-1) shown below; in Formula (3-1), c is an integer of 0 to 3; in Formula (1), [B] is represented by Formula (3-2) shown below; in Formula (3-2), d is an integer of 0 to 3, and e is an integer of 2 to 5, provided that a sum of c in Formula (3-1) and d in Formula (3-2) is 1 to 3; in Formula (1), [A] and [B] may be interchanged; in Formula (1), [C] is represented by Formula (4-1) shown below; in Formula (4-1), f is an integer of 0 to 3; in Formula (1), [D] is represented by Formula (4-2) shown below; in Formula (4-2), g is an integer of 0 to 3, and h is an integer of 2 to 5, provided that a sum of f in Formula (4-1) and g in Formula (4-2) is 1 to 3; in Formula (1), [C] and [D] may be interchanged; when [C] is directly bonded to $R^3$, $R^3$ does not become a hydrogen atom; and a number of hydroxyl groups in Formula (1) is 3 or more, and a number of hydroxyl groups in $R^1$ and $R^3$ are each 0 or 1).

$$-\left[\left(-CH_2-\right)_a-O\right]_b-X^1 \quad (2)$$

(3-1)

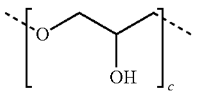

(3-2)

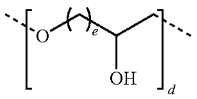

(4-1)

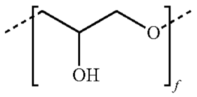

(4-2)

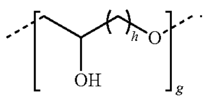

2. The fluorine-containing ether compound according to claim 1, wherein $R^1$ in Formula (1) has any of structures represented by Formulae (5-1) to (5-5) shown below:

(5-1)

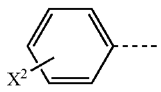

(5-2)

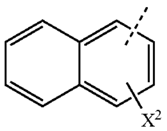

-continued (5-3)

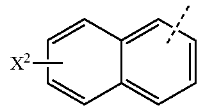

(5-4)

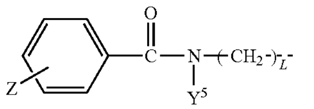

(5-5)

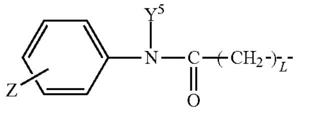

(in Formulae (5-1) to (5-3), $X^2$ is one, or two or more groups represented by Formula (6-1) or (6-2))

(in Formulae (5-4) and (5-5), $Y^5$ is a hydrogen atom or an alkyl group having 1 to 6 carbon atoms; L represents an integer of 1 to 6; and Z is any one, or two or more selected from among a hydrogen atom, an alkyl group having 1 to 6 carbon atoms, an alkoxy group having 1 to 6 carbon atoms, and a group represented by Formula (6-1) or (6-2))

(6-1)

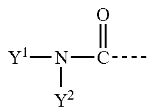

(6-2)

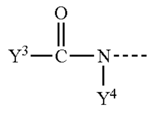

(in Formula (6-1), $Y^1$ and $Y^2$ are each independently a hydrogen atom, an alkyl group having 1 to 7 carbon atoms, or a cyclic structure in which $Y^1$ and $Y^2$ are bonded to each other;

and a total number of carbon atoms contained in Formula (6-1) is 1 to 8) (in Formula (6-2), $Y^3$ is an alkyl group having 1 to 7 carbon atoms, and $Y^4$ is a hydrogen atom or an alkyl group having 1 to 6 carbon atoms; $Y^3$ and $Y^4$ may be bonded to each other to form a cyclic structure; and a total number of carbon atoms contained in Formula (6-2) is 2 to 8).

3. The fluorine-containing ether compound according to claim 1, wherein $R^1$-[B]-[A]-and-[C]-[D]-$R^3$ in Formula (1) are the same.

4. The fluorine-containing ether compound according to claim 1, wherein $X^1$ in Formula (2) is a hydrogen atom.

5. The fluorine-containing ether compound according to claim 1, wherein-[C]-[D]-$R^3$ in Formula (1) is any of Formulae (7-1) to (7-3) shown below:

(7-1)

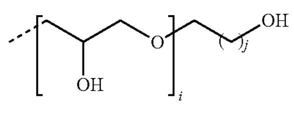

-continued (7-2)

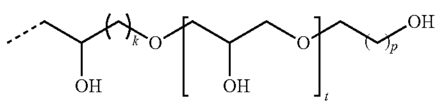

(7-3)

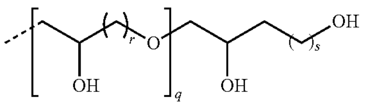

(in Formula (7-1), i represents 1 or 2, and j represents an integer of 1 to 5)

(in Formula (7-2), k represents an integer of 2 to 5, t represents 0 or 1, and p represents an integer of 1 to 5)

(in Formula (7-3), q represents 0 or 1, r represents an integer of 1 to 5, and s represents an integer of 1 to 4).

6. The fluorine-containing ether compound according to claim 1, wherein $R^2$ in Formula (1) is represented by Formula (8-1) shown below:

$$-(CF_2)_{w1}-O-(CF_2O)_{w2}-(CF_2CF_2O)_{w3}-(CF_2CF_2CF_2O)_{w4}-(CF_2CF_2CF_2CF_2O)_{w5}-(CF_2)_{w6}- \quad (8\text{-}1)$$

(in Formula (8-1), w2, w3, w4, and w5 indicate an average degree of polymerization, and each independently represent 0 to 30, provided that w2, w3, w4, and w5 are not all 0 at the same time; w1 and w6 are an average value indicating the number of $CF_2$'s, and each independently represent 1 to 3; and an arrangement order of repeating units in Formula (8-1) is not particularly limited).

7. The fluorine-containing ether compound according to claim 1, wherein $R^2$ in Formula (1) is any of Formulae (8-2) to (8-5) shown below:

$$-CF_2O-(CF_2CF_2)_u-(CF_2O)_v-CF_2- \quad (8\text{-}2)$$

(in Formula (8-2), u and v represent an average degree of polymerization of 0 to 30, provided that at least one of u or v is 0.1 or more)

$$-(CF_2)_{w7}-O-(CF_2CF_2CF_2O)_{w8}-(CF_2CF_2O)_{w9}(CF_2)_{w10}- \quad (8\text{-}3)$$

(in Formula (8-3), w8 and w9 indicate an average degree of polymerization, and each independently represent 0.1 to 30; and w7 and w10 are an average value indicating the number of $CF_2$'s, and each independently represent 1 to 2)

$$-CF_2CF_2O-(CF_2CF_2CF_2O)_x-CF_2CF_2- \quad (8\text{-}4)$$

(in Formula (8-4), x indicates an average degree of polymerization, and represents 0.1 to 30)

$$-CF_2CF_2CF_2O-(CF_2CF_2CF_2CF_2O)_y-CF_2CF_2CF_2- \quad (8\text{-}5)$$

(in Formula (8-5), y indicates an average degree of polymerization, and represents 0.1 to 30).

8. The fluorine-containing ether compound according to claim 1, wherein a number-average molecular weight thereof is in a range of 500 to 10,000.

9. A lubricant for a magnetic recording medium comprising the fluorine-containing ether compound according to claim 1.

10. A magnetic recording medium in which at least a magnetic layer, a protective layer, and a lubricating layer are sequentially provided on a substrate, wherein the lubricating layer contains the fluorine-containing ether compound according to claim 1.

11. The magnetic recording medium according to claim 10, wherein the lubricating layer has an average film thickness of 0.5 nm to 2.0 nm.

* * * * *